(12) United States Patent
Araki et al.

(10) Patent No.: US 8,447,915 B2
(45) Date of Patent: May 21, 2013

(54) FLASH MEMORY DEVICE FOR ALLOCATING PHYSICAL BLOCKS TO LOGICAL BLOCKS BASED ON AN ERASE COUNT

(75) Inventors: Akihiko Araki, Yokohama (JP);
Sadahiro Sugimoto, Kawasaki (JP);
Masayuki Yamamoto, Sagamihara (JP);
Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 285 days.

(21) Appl. No.: 12/668,755

(22) PCT Filed: Jul. 23, 2009

(86) PCT No.: PCT/JP2009/003470
§ 371 (c)(1),
(2), (4) Date: Jan. 12, 2010

(87) PCT Pub. No.: WO2011/010348
PCT Pub. Date: Jan. 27, 2011

(65) Prior Publication Data
US 2011/0191521 A1    Aug. 4, 2011

(51) Int. Cl.
*G06F 12/00* (2006.01)
(52) U.S. Cl.
USPC .................. 711/103; 365/185.3; 365/185.33; 711/E12.008

(58) Field of Classification Search
USPC ....... 711/103, E12.008, 164, 156; 365/185.3, 365/185.33
See application file for complete search history.

(56) References Cited

U.S. PATENT DOCUMENTS

| | | | | |
|---|---|---|---|---|
| 5,680,579 | A * | 10/1997 | Young et al. | 711/157 |
| 5,930,193 | A | 7/1999 | Achiwa et al. | |
| 7,035,967 | B2 * | 4/2006 | Chang et al. | 711/103 |
| 7,409,492 | B2 * | 8/2008 | Tanaka et al. | 711/103 |
| 7,908,423 | B2 * | 3/2011 | Hsu et al. | 711/100 |
| 7,936,610 | B1 * | 5/2011 | Melcher et al. | 365/185.25 |
| 8,261,013 | B2 * | 9/2012 | Schmidberger | 711/103 |
| 2008/0320213 | A1 * | 12/2008 | Kinoshita | 711/103 |
| 2009/0070520 | A1 | 3/2009 | Mizushima | |
| 2009/0287875 | A1 * | 11/2009 | Lin | 711/103 |
| 2010/0268865 | A1 * | 10/2010 | Ramiya Mothilal | 711/103 |

FOREIGN PATENT DOCUMENTS

| | | | |
|---|---|---|---|
| JP | 8-016482 | | 1/1996 |
| JP | 2006268880 A | * | 10/2006 |
| JP | 2009-064251 | | 3/2009 |
| WO | WO 2008077284 A1 | * | 7/2008 |

* cited by examiner

*Primary Examiner* — Pierre-Michel Bataille
(74) *Attorney, Agent, or Firm* — Brundidge & Stanger, P.C.

(57) ABSTRACT

A controller in a flash memory device manages erase count of each physical block and manages the erase frequency of each logical block. The controller allocates a logical block whose erase frequency is high to one or more physical blocks whose erase count is low.

9 Claims, 23 Drawing Sheets

140
MAPPING TABLE

| LOGICAL BLOCK NUMBER | Chip number 141 | Physical block number 142 |
|---|---|---|
| 0 | 0 | 812 |
| 1 | 12 | 5200 |
| 2 | NULL | NULL |
| ... | ... | ... |

FIG. 6

LOGICAL BLOCK MANAGEMENT INFORMATION ~160

LOGICAL BLOCK TABLE ~161

| Logical block number ~162 | Erase frequency ~163 | Logical block classification flag ~164 | Allocation time ~165 | Forward pointer ~154 | Backward pointer ~155 |
|---|---|---|---|---|---|
| 0 | 10 | 0 | 2009/05/15 03:00 | 0x68401c | 0x51038f |
| 1 | 18 | 1 | 2009/05/15 03:01 | 0x568a08 | 0x31a0d8 |
| 2 | 0 | 0 | 0 | 0xb2553c | 0x2ea38e |
| 3 | 78 | 1 | 2009/05/18 09:15 | 0x56a828 | 0x0020a1 |
| ... | ... | ... | ... | ... | ... |

LOGICAL BLOCK CLASSIFICATION THRESHOLD COUNTER ~166

| 15 |
|---|

FIG.8

FREE BLOCK TABLE ~170

| Chip number ~141 | Physical block number ~142 | Counter of erase count ~153 | Forward pointer ~154 | Backward pointer ~155 |
|---|---|---|---|---|
| 0 | 38 | 3860 | 0x68401c | 0x51038f |
| 3 | 860 | 230 | 0x568a08 | 0x31a0d8 |
| 0 | 2 | 0 | 0xb2553c | 0x2ea38e |
| 1 | 22300 | 688 | 0x56a828 | 0x0020a1 |
| ... | ... | ... | ... | ... |

FIG.9

FLASH MEMORY DEVICE FOR ALLOCATING PHYSICAL BLOCKS TO LOGICAL BLOCKS BASED ON AN ERASE COUNT

TECHNICAL FIELD

This invention relates to a storage system comprising multiple flash memory chips.

BACKGROUND ART

For a flash memory, due to its characteristic, when intending to rewrite data, it is not impossible for the data which was originally stored in the physical area to be overwritten directly on the physical area. For rewriting data, after performing data erase processing in erase units of flash memories named "blocks", data must be rewritten. The number of times of performing the erase processing for these blocks has the upper limit due to the physical limitation. A flash memory block has the characteristic that, if the erase count exceeds this upper limit, no more data can be stored in the block.

For this reason, if the method of fixedly allocating a data storage address to each flash memory block is applied, the erase count of a block in which part of frequently erased data is stored increases, which causes the block to be unavailable in the course of time.

As a technology for preventing such cases, the technology named wear-leveling, as shown in the PLT 1, is published. According to the basic concept of wear-leveling, besides a physical address for a physical block (physical block), a logical address for a logical block (logical block) is prepared, and the logical address corresponding with the physical address is changed appropriately.

Furthermore, a technology, as shown in the PLT 2, in which the area of a physical block is divided into two and one of the divided areas is used as an area for storing update data is also well-known. According to the PLT 2, data is written to the first area of the two areas provided in one block and, if data stored in the first area is to be overwritten, the overwritten data (update data) is additionally written to the second area. As the erase processing occurs when the second area becomes full and impossible to accept further additional write, the occurrence of overwrite (update write) for the physical block does not necessarily mean that the physical block requires the erase processing. Therefore, the number of times of the erase processing for the physical block (the erase count of the physical block) can be inhibited.

CITATION LIST

PLT

[PLT 1] Japanese Published Examined Patent Application No. 3507132
[PLT 2] Japanese Published Unexamined Patent Application No. 2009-64251

Technical Problem

The technology shown in the PLT 1 uses the erase count of physical blocks and the write frequency of logical blocks as the information for determining the correspondence of physical blocks and logical blocks. According to the PLT 1, frequently written logical blocks are allocated to physical blocks with the low erase count, and infrequently written logical blocks are allocated to physical blocks with the high erase count.

On the other hand, some flash memories can, without performing the erase processing for one or more physical blocks allocated to logical blocks, have data written to the one or more physical blocks for multiple times. This type of flash memory, for example, includes the flash memory with the smaller unit of reading and writing data than the erase unit which is, as more specifically described, the NAND-type flash memory. Furthermore, some flash memories apply the technology shown in the PLT 2.

As for this type of flash memory, the write frequency before block erase is performed becomes uneven. For example, multiple times of write may cause one time of block erase while one time of write may also cause one time of block erase.

Considering this, even if the technology of the PLT 1 is simply applied to this type of flash memory, it is difficult to resolve the unevenness of the erase count of the blocks.

Therefore, the object of this invention is to resolve the uneven block erase count in a flash memory device capable of, for one or more physical blocks allocated to logical blocks, without performing the erase processing, having data written to the one or more physical blocks for multiple times.

SUMMARY OF THE INVENTION

Solution to Problem

The controller of the flash memory device manages erase count for each of physical blocks and manages the erase frequency for each of logical blocks. The controller allocates frequently erased logical blocks to one or more physical blocks with the low erase count (it is also possible to allocate infrequently erased logical blocks to one or more physical blocks with the high erase count). As more specifically described, for example, the controller classifies physical blocks depending on whether the erase count is high or low, and classifies logical blocks depending on whether the erase frequency is high or low. The controller, if a highly frequently erased first logical block is allocated to a first physical block with the high erase count and, at the same time, an infrequently erased second logical block is allocated to a second physical block with the low erase count, replaces the allocation destinations of the first and second logical blocks. That is, the controller allocates the second logical block to the first physical block, and allocates the first logical block to the second physical block.

A flash memory device may be a flash memory drive (for example, a USB (Universal Serial Bus) flash memory), a storage system comprising multiple flash memory drives, or a computer. Therefore, the controller of a flash memory device may be the controller in the flash memory drive, the storage controller in the storage system which accesses the flash memory drive in response to an access request from the host, or the processor in the computer.

Advantageous Effects of Invention

According to this invention, it is possible to resolve the uneven block erase count in a flash memory device capable of, for one or more physical blocks allocated to logical blocks, without performing the erase processing, having data written to the one or more physical blocks for multiple times.

BRIEF DESCRIPTION OF DRAWINGS

FIG. 6 is a diagram showing an example of a mapping table 140.

FIG. 8 is a diagram showing an example of the logical block management information.

FIG. 9 is a diagram showing an example of a free block table 170.

DESCRIPTION OF EMBODIMENTS

Figure 1:
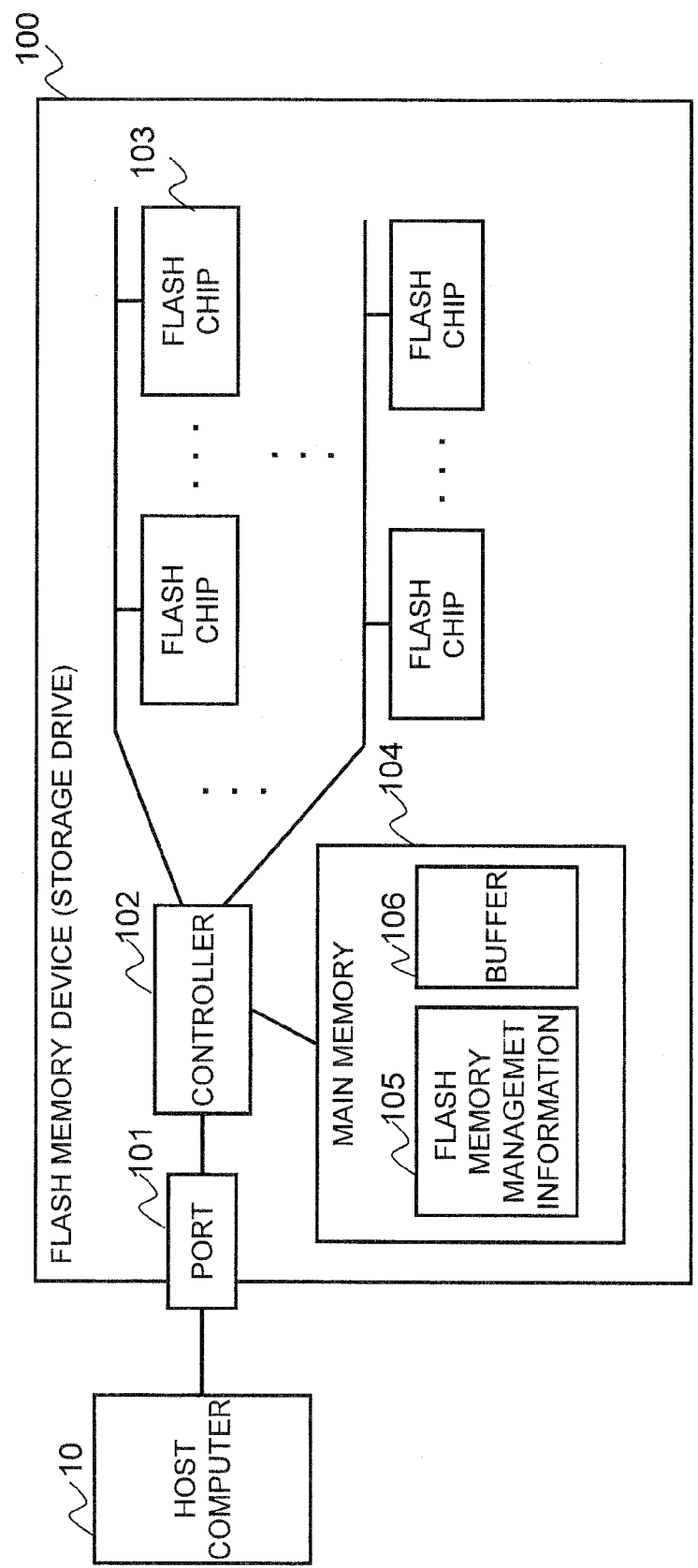
FIG. 1 is a block diagram showing an example of a flash memory device related to the Embodiment 1.

Before describing several embodiments of this invention, the terms are described below.

A "block" is a unit of erase in a flash memory. A "page" is a unit of reading and writing flash memory data. One block is configured of multiple pages.

Furthermore, though this embodiment classifies physical blocks according to the erase count, for the purpose of simplifying the description, physical blocks are hereinafter classified into two categories, depending on whether the number of counts of erasing physical blocks is high or low. That the erase count is high is referred to as "Old" and that the erase count is low is referred to as "Young". Furthermore, a physical block whose erase count is high may be referred to as an "Old block" and a physical block whose erase count is low may be referred to as a "Young block".

Furthermore, though this embodiment classifies logical blocks according to the erase frequency, for the purpose of simplifying the description, logical blocks are hereinafter classified into two categories, depending on whether the erase frequency is high or low. That the erase frequency is high is referred to as "Hot" and that the erase frequency is low is referred to as "Cold". Furthermore, a frequently erased logical block may be referred to as a "Hot block" and an infrequently erased logical block may be referred to as a "Cold block".

Some of the embodiments of this invention are described below with reference to each of the figures. Note that, in the description below, the parts given the same reference numerals and comprising the same components basically perform the same operations, and therefore, the overlapping descriptions are omitted.

Embodiment 1

The Embodiment 1 is described below with reference to FIGS. 1 to 18.

FIG. 1 is a block diagram showing an example of a flash memory device related to the Embodiment 1.

The flash memory device 100 is, for example, a storage drive (flash drive) comprising multiple flash memory chips. The flash memory device 100 may also be an SSD (Solid State Drive).

The flash memory device 100 comprises one or more host interface ports 101 performing data communication with a host computer (hereinafter referred to as a host) 10, one or more controllers 102 controlling the flash memory device 100, multiple flash memory chips storing data (hereinafter referred to as flash chips) 103, and one or more main memories 104. The flash chips 103 comprise multiple physical blocks.

The main memory 104 stores flash memory management information 105 and, at the same time, comprises a data buffer 106. The flash memory management information 105 includes a control program including the wear-leveling program, a mapping table 140 which is described later (refer to FIG. 6), physical block management information 150 (refer to FIG. 7), logical block management information (refer to FIG. 8), a free block table 170 (refer to FIG. 9), a Hot block group table (refer to FIG. 10), a Cold block group table (refer to FIG. 11), and a free block group table (refer to FIG. 12). Note that this embodiment assumes that the controller 102 performs the various types of processing described below with appropriate reference to the flash memory management information 105.

Figure 2:
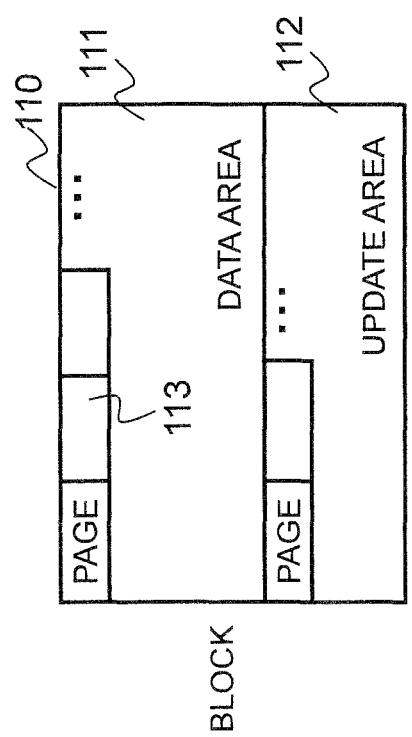
FIG. 2 is a diagram showing an example of the method of using areas in a physical block 110.

FIG. 2 is a diagram showing an example of the method of using areas in a physical block 110.

In this embodiment, as described above, the unit of erasing flash memory is blocks, and the unit of reading and writing flash memory is pages which are smaller than blocks. Therefore, one physical block 110 is configured of multiple pages 113.

The area in a physical block 110 is divided into two, for example. The first area is used as a data area 111 for storing data, and the second area is used as an update area 112 for storing the update data of the data existing in the data area 111. The area in a physical block may also be permitted to be divided into three or more. For example, in one physical block, multiple area sets of data areas and update areas may also be permitted to exist and, in that case, multiple logical blocks may also be permitted to be allocated to multiple area sets in one physical block. Other cases where one physical block is not divided into multiple areas may also be permitted. For example, there may also be permitted to be a physical block with a data area only and a physical block with an update area only.

Figure 3:
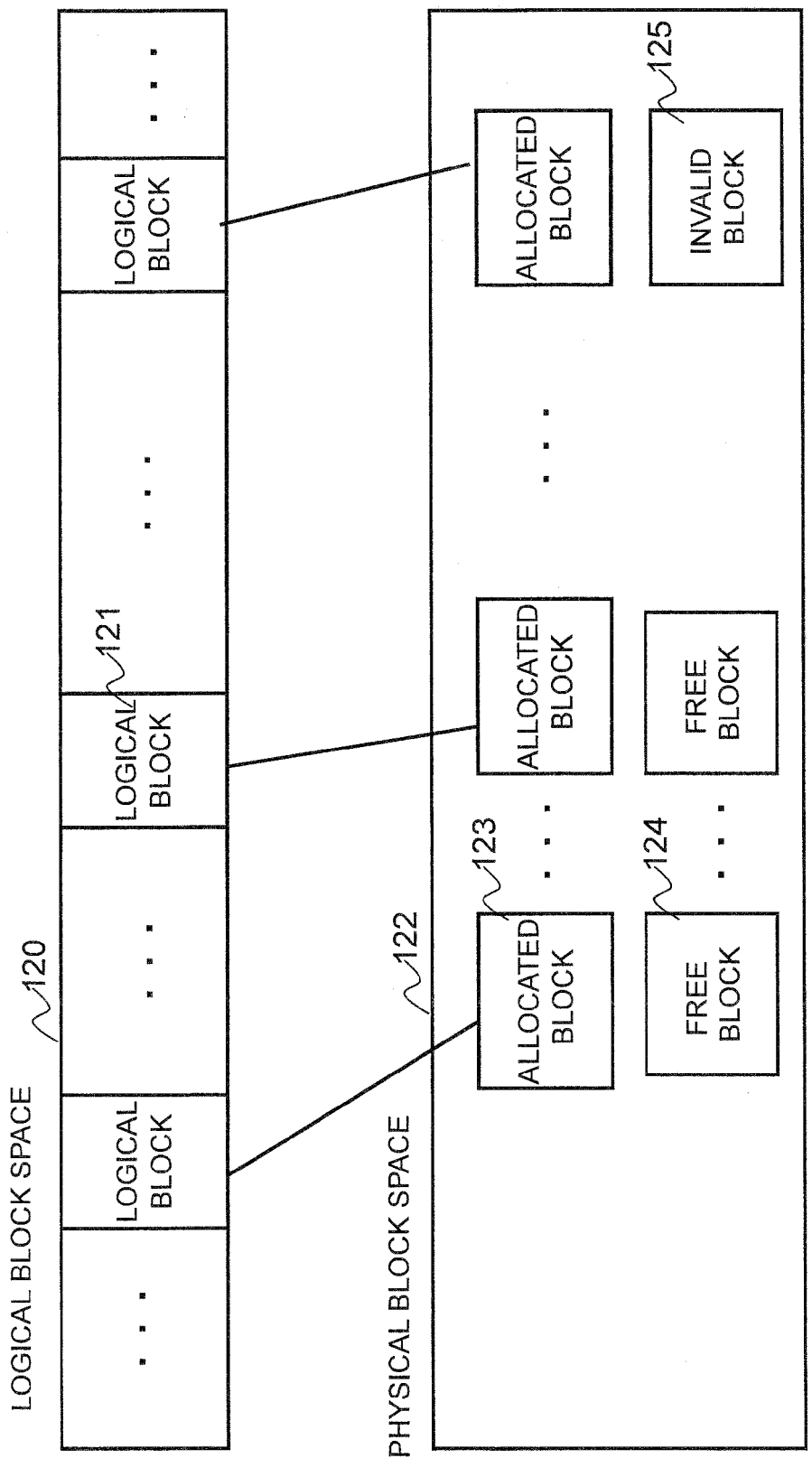
FIG. 3 is a diagram showing an example of the conceptual correspondence of logical blocks with physical blocks.

FIG. 3 is a diagram showing an example of the conceptual correspondence of logical blocks with physical blocks.

A logical block space 120 is the space visible from the host 10 and configured of multiple logical blocks 121. That is, the logical block space 120 is a set of logical blocks. The logical block space 120 is the concept indicating all logical blocks 121 in flash memory devices.

A physical block space 122 is the concept indicating all physical blocks in flash memory devices. Each physical block configuring the physical block space 122 is, for example, either an allocated block 123, or a free block 124, or an invalid block 125.

An allocated block 123 is a physical block to which a logical block 121 is allocated.

A free block 124 is a physical block unallocated to any logical blocks and, at the same time, a logical block can be allocated to.

An invalid block 125 is a physical block whose erase count has reached the upper limit or a physical block incapable of storing data due to a failure or other reasons. Therefore, no logical block is and will be allocated to an invalid block 125.

Figure 4:
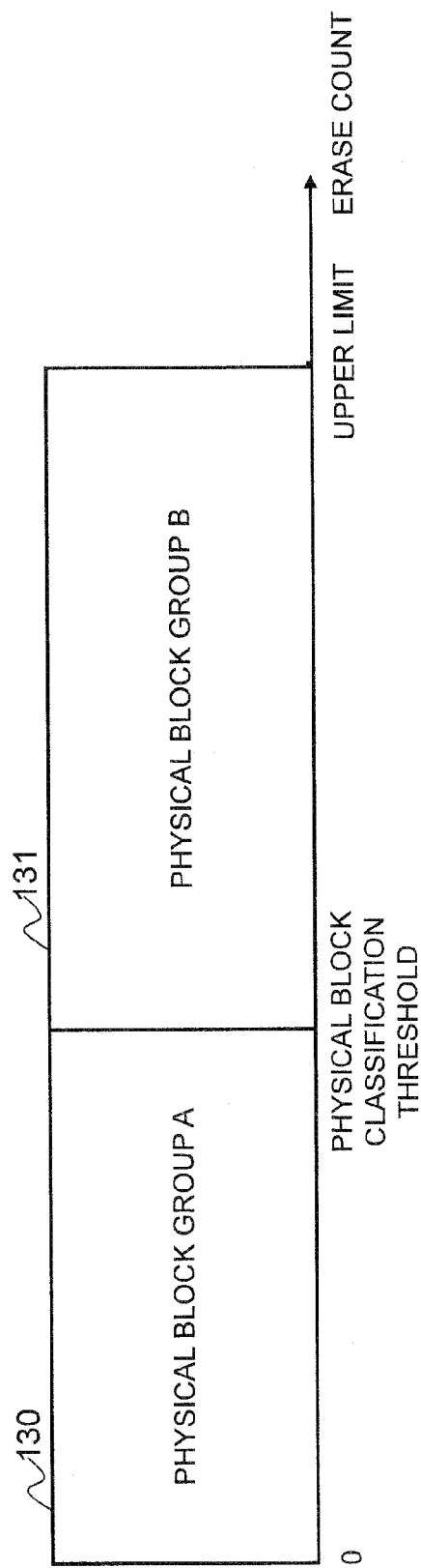
FIG. 4 is a diagram showing an example of physical block groups.

FIG. 4 is a diagram showing an example of physical block groups.

For classifying all physical blocks, the threshold of the erase count (hereinafter referred to as a physical block classification threshold) is specified. Therefore, each physical block can be classified as belonging to either the group A 130 of physical blocks whose erase count is lower than the physical block classification threshold or the group B 131 of physical blocks whose erase count is equal to or higher than the physical block classification threshold.

Note that the physical block classification threshold is, for example, the value based on the statistics of erase count of all physical blocks (for example, the average value). However, not limited to that, other types of values may also be permitted to be adopted.

Furthermore, the number of groups of physical blocks is not necessarily two. With more than two groups, the improved accuracy of classification based on the erase count can be expected.

Figure 5:
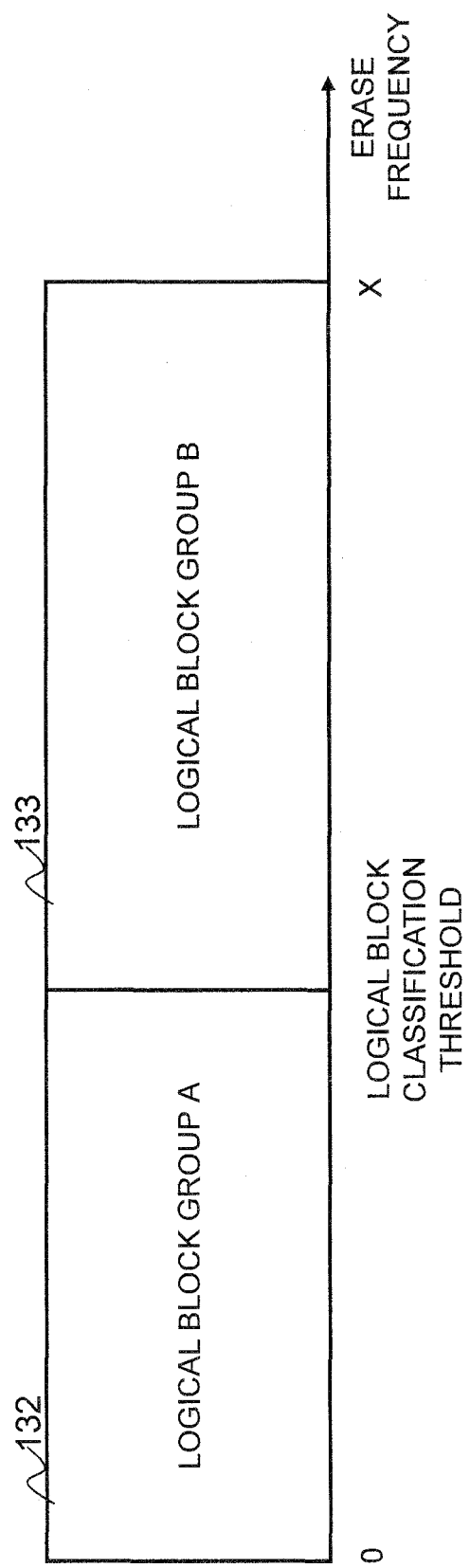
FIG. 5 is a diagram showing an example of logical block groups.

FIG. 5 is a diagram showing an example of logical block groups.

For classifying all logical blocks, the threshold of the erase frequency (hereinafter referred to as a logical block classification threshold) is specified. Therefore, each logical block can be classified as belonging to either the group A 132 of logical blocks whose erase frequency is lower than the logical block classification threshold or the group B 133 of logical blocks whose erase frequency is equal to or higher than the logical block classification threshold.

Note that the logical block classification threshold is, for example, the value based on the statistics of the erase frequencies of all logical blocks (for example, the average value). However, not limited to that, other types of values may also be permitted to be adopted.

Furthermore, the number of groups of logical blocks is not necessarily two. With more than two groups, the improved accuracy of classification based on erase frequency can be expected.

FIG. 6 is a diagram showing an example of a mapping table 140.

The mapping table 140 is the table showing the correspondence relationship of the addresses in the physical block space 122 and the addresses in the logical block space 120. The mapping table 140 has the array of logical block addresses as indexes and physical block addresses as factors. To one logical block address, up to one physical block address is made to correspond. If no physical block is made to correspond to a certain logical block, a null value is stored in the physical block address of the mapping table 140. At this point, a "physical block address" is configured of a number 141 of a flash chip 103 in the flash memory device 100 and a number 142 of a physical block in the flash chip 103.

Figure 7:
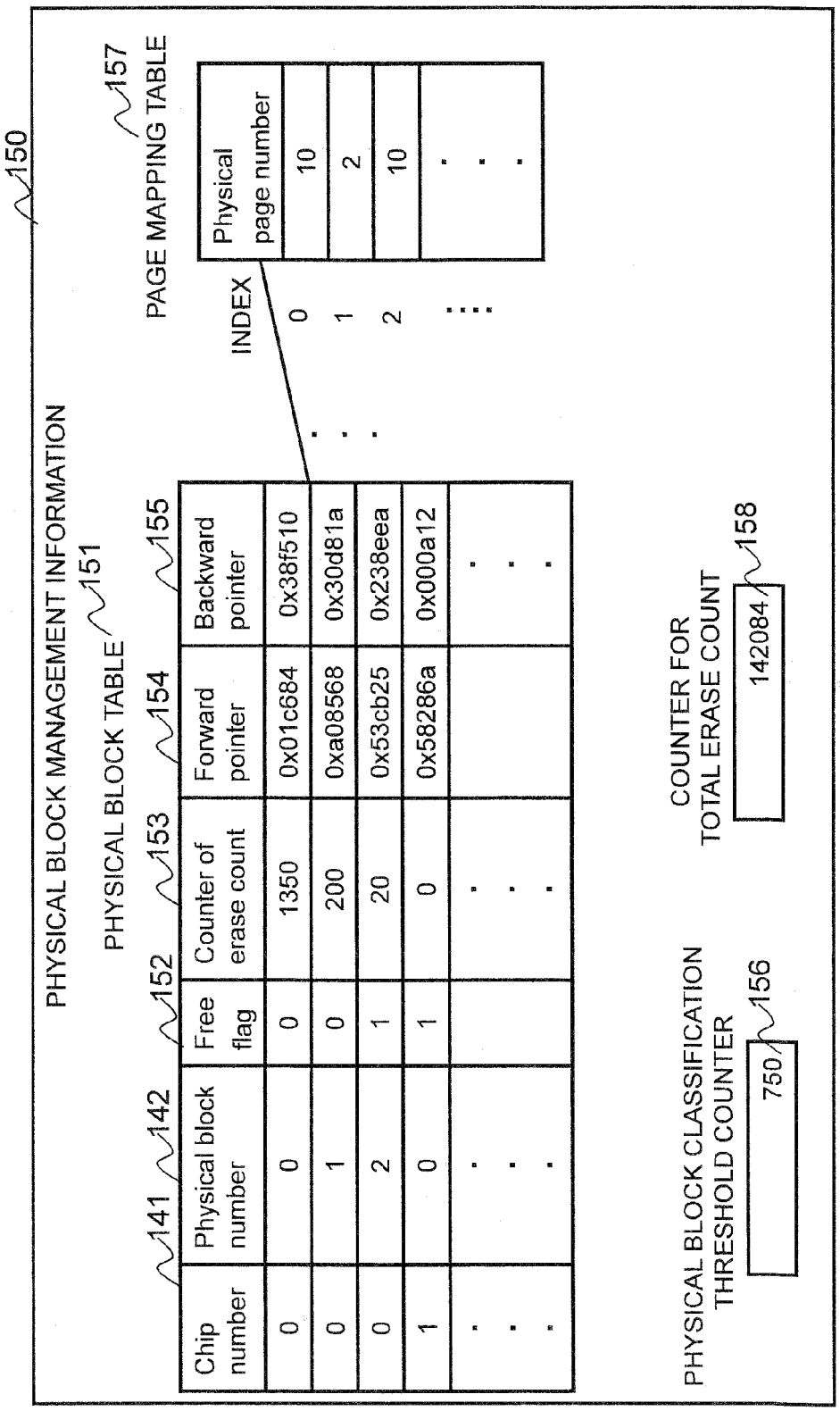
FIG. 7 is a diagram showing an example of the physical block management information 150.

FIG. 7 is a diagram showing an example of the physical block management information 150.

The physical block management information 150 is the information for managing physical blocks. The physical block management information 150 includes a physical block table 151, a physical block classification threshold counter 156, a page mapping table 157, and a counter for total erase count 158.

The physical block table 151 is the table comprising the information such as the status and the erase count of each physical block. This table 151, for each physical block, includes a chip number 141, a physical block number 142, a free flag 152, a counter of the erase count 153, a forward pointer 154, and a backward pointer 155. Each factor is described below with reference to one physical block as an example (referred to as a "target physical block" in the description of FIG. 7).

The chip number 141 is the number for a flash chip including the target physical block.

The physical block number 142 is the number for the target physical block.

The free flag 152 is the information showing whether the target physical block is a free block or not. For example, the free flag 152 shows the value "1" if the target physical block is a free block and shows "0" otherwise.

The counter of the erase count 153 shows the cumulative count of erasing the target physical block. If the counter of the erase count 153 reaches the upper limit of erase count in the flash memory, the target physical block is managed as an invalid block.

The forward pointer 154 and the backward pointer 155 are the pointers linking multiple physical blocks classified according to the erase count.

The physical block classification threshold counter 156 is the threshold showing the border for classifying physical blocks. The physical blocks whose erase count is lower than the physical block classification threshold counter 156 is classified as belonging to the physical block group A 130, and physical blocks whose erase count is equal to or higher than the physical block classification threshold counter 156 is classified as belonging to the physical block group B 131. The physical block classification threshold counter 156 is, for example, the average value of the counter of the erase count 153.

The page mapping table 157 is the table showing which page of data in the data area is stored by each page of the update area of the physical block. In this table 157, the indexes show the numbers for the pages in the update area and the factors show the numbers for the pages in the data area. In the page mapping table 157, it can be considered that, if the update data is additionally written in the order of pages in the update area, the latest data is stored in the pages behind. For example, in the index numbers 0 and 2, the update data for the page number 10 of the data area in the same physical block is stored. In this case, it can be ascertained that the latest data of the page number 10 of the data area is stored in the page of the index number 2 which is behind the index number 0.

The counter for total erase count 158 is the total sum of the erase count 753 of all physical blocks in the flash memory device 100. Each time a physical block is erased, 1 is added to the counter for total erase count 158.

To the physical block table 151, for each physical block, the information showing which of the categories, "Young" or "Old", the physical block is classified may also be permitted to be registered.

FIG. 8 is a diagram showing an example of the logical block management information.

The logical block management information 160 is the information for managing logical blocks. The logical block management information 160 includes a logical block table 161 and a logical block classification threshold counter 166.

The logical block table 161, for each logical block, includes a logical block address 162, the erase frequency 163, a logical block classification flag 164, the allocation time 165, a forward pointer 154, and a backward pointer 155. Each factor is described below with reference to one logical block as an example (referred to as a "target logical block" in the description of FIG. 8).

The logical block address 162 is the address of the target logical block visible from the host 10.

The erase frequency 163 shows the erase frequency of the target logical block. In this embodiment, the erase frequency 163 is the erase count in a unit of time (for example, the erase count per day or per month). However, not limited to that, other types of values may also be permitted to be adopted as the erase frequency, for example, the length of time before reaching the previously specified erase count (for example, the length of time which took until reaching erase count is one thousand).

The logical block classification flag 164 is the information showing to which the target logical block belongs, the logical block group A 132 or the logical block group B 133. In this embodiment, as each of the logical blocks is classified into either high or low erase frequency, the logical block classification flag 164 may be permitted to be two types of values. However, if logical blocks are classified into more than two types, the values which can be applied by the logical block classification flag 164 may be permitted to range corresponding with the number of classification types.

The allocation time 165 shows the time at which the target logical block is allocated to a physical block first. Note that the allocation time 165 is not limited to the time information as long as it is the information for calculating the erase frequency.

The forward pointer 154 and the backward pointer 155 in this table 161 are the pointers mutually linking multiple logical blocks classified according to the erase frequency.

The logical block classification threshold counter 166 is the logical block classification threshold. The logical blocks whose erase frequency is lower than the logical block threshold counter 166 is classified as belonging to the logical block group A 132, and logical blocks whose erase frequency is equal to or higher than the logical block classification threshold counter 166 is classified as belonging to the logical block group B 133. The logical block classification threshold counter 166 is, for example, the average value of the erase frequencies of all logical blocks in the flash memory device 100.

FIG. 9 is a diagram showing an example of a free block table 170.

The free block table 170 is the information for managing free blocks in the flash memory device 100. The free block table 170, for each free block, includes a chip number 141 showing the address of the free block, a physical block number 142, a counter of the erase count 153 showing the cumulative count of erasing free blocks, a forward pointer 154 and a backward pointer 155 for mutually linking free blocks.

Figure 10:
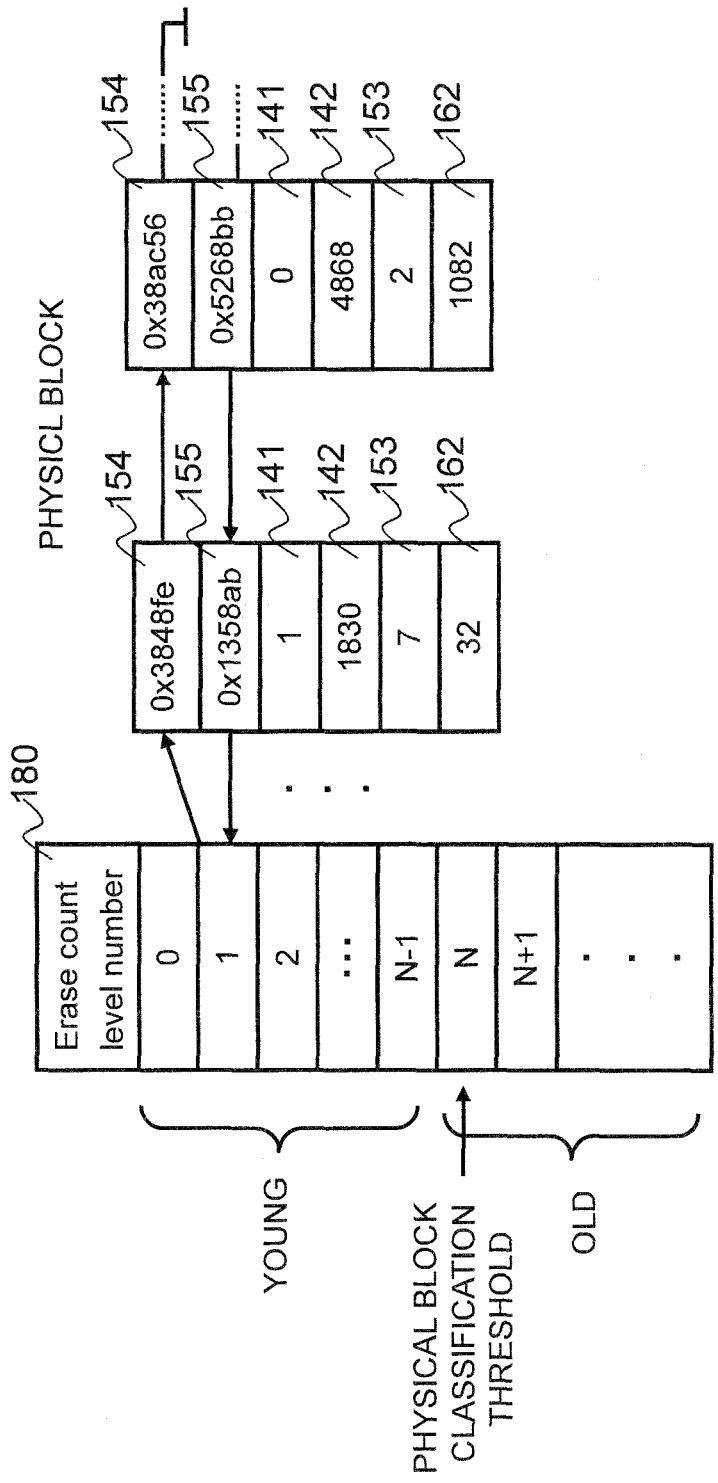
FIG. 10 is a diagram showing an example of a Hot block group table.

FIG. 10 is a diagram showing an example of a Hot block group table.

This table is the table for managing Hot block groups. The Hot block group table is the list for classifying the physical blocks to which Hot blocks are allocated into several levels according to the erase count. As more specifically described, for example, the Hot block group comprises multiple erase count level number 180. To each level number 180, a physical block corresponding to the level of the erase count indicated by that number is linked by the pointers 154 and 155. Furthermore, the physical blocks belonging to the same level number 180 are also linked to each other by the pointers 154 and 155.

At this point, the erase count level number 180 is the number for identifying level of the erase count. For example, if a different level exists every one hundred counts of erase, the physical blocks whose erase count is from 0 to 99 are considered to belong to the level number 0. Note that the level of the erase count may be permitted to be the erase count itself. In other cases, for logical blocks, the concept of the erase frequency level may also be permitted to exist. In that case, each erase frequency level may be permitted to be the erase frequency itself or defined by the range of the erase frequency (for example, the erase frequency 0 to 50 may be permitted to belong to the erase frequency level 0). Therefore, for example, the level of the erase count to which the physical block classification threshold belongs may be the same as the physical block classification threshold, and the erase frequency threshold level to which the logical block classification threshold belongs may be the same as the logical block classification threshold.

In this embodiment, as shown in FIG. 10, the physical blocks whose erase count is equal to or higher than the level of the erase count to which the physical block classification threshold belongs are "Old" blocks, and the physical blocks whose erase count is lower than the level of the erase count to which the physical block classification threshold belongs are "Young" blocks.

Note that, though this embodiment classifies each physical block as either a Young block or an Old block, there may also be permitted to be three or more physical block groups in accordance with the erase count. In other cases, though the example in FIG. 10 shows multiple levels of the erase count for each of the Young and the Old, it may also be permitted that there is only one level of the erase count belonging to each of physical block groups in accordance with the erase count. Furthermore, the number of levels in classifying groups is not limited. The physical blocks linked by the erase count level number are linked by the forward pointer 154 and the backward pointer 155 stored in the physical block table 151, and create the bi-directionally searchable list configuration. Furthermore, each physical block may be permitted to include a chip number 141, a physical block number 142, a counter of the erase count 153, and a logical block number 162 (the number for the logical block allocated to that physical block).

Figure 11:
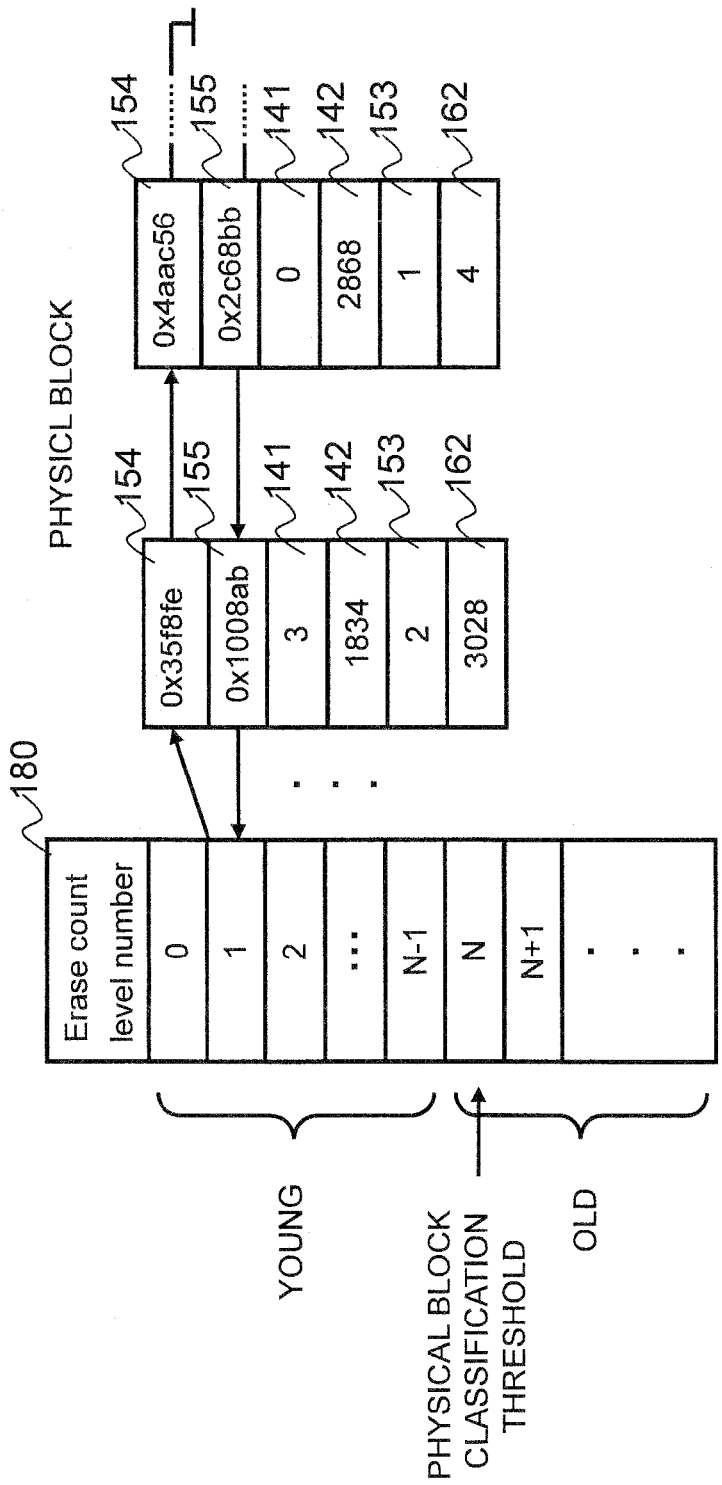
FIG. 11 is a diagram showing an example of a Cold block group table.

FIG. 11 is a diagram showing an example of a Cold block group table.

This table is the table for managing Cold blocks. The Cold block group table is the list for classifying the levels of physical blocks to which Cold blocks are allocated according to the erase count. As more specifically described, for example, the configuration of the Cold block group is nearly the same as the configuration of the above-mentioned Hot block group table.

In the Hot block group table and the Cold block group table, if a physical block is erased (as more specifically described, if the erase processing is performed for the physical block), the physical block is considered to be a free block. Therefore, the physical block is required to be registered to the free block group table to be described later (refer to FIG. 12). Therefore, the erased physical block is deleted from the Hot block group table or the Cold block group table. On the other hand, if a logical block is allocated to a free block, in accordance with the erase frequency of the allocated logical block, the free block (physical block) is classified as belonging to the Hot block group table or the Cold block group table and, at the same time, is linked to the erase count level number 180 in accordance with the erase count of the physical block.

Figure 12:
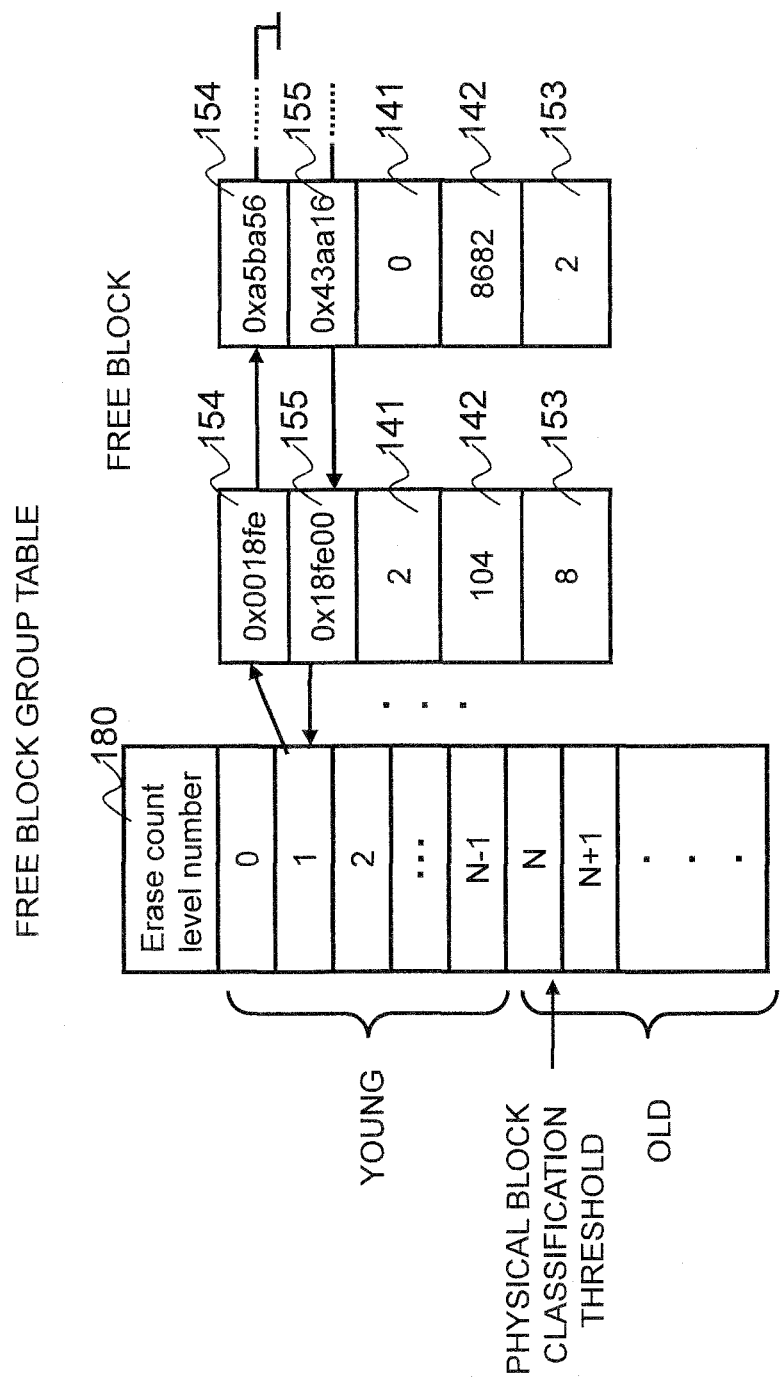
FIG. 12 is a diagram showing an example of a free block group table.

FIG. 12 is a diagram showing an example of a free block group table.

This table is the table for managing free block groups. The free block group table is the list for classifying the levels of free blocks according to the erase count. As more specifically described, for example, the configuration of the free block group is nearly the same as the configuration of the above-mentioned Hot block group table. Furthermore, the range of the level 180 for the erase count may be permitted to be the same in the Hot block group table, the Cold block group table, and the free block group table, or may also be different.

The processing performed in this embodiment is described below.

Figure 13:
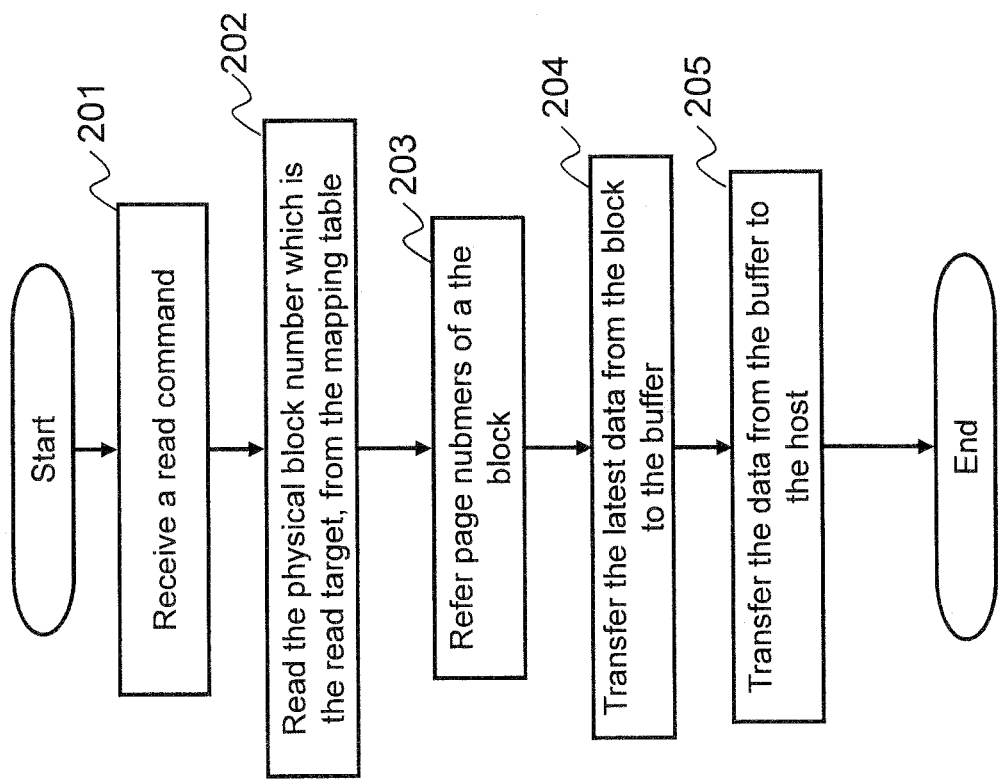
FIG. 13 is an example of a flowchart showing the flow of the read processing.

FIG. 13 is an example of a flowchart showing the flow of the read processing.

Firstly, the controller 102 receives a read command from the host 10 (step 201). The read command from the host 10 specifies a logical block address. Therefore, the logical block address must be converted into the physical block address in the flash memory device 100.

Therefore, the controller 102 reads the physical block number as the read target (i.e. the number for the physical block to which the logical block comprising the specified logical block address is allocated) from the mapping table 140 (step 202).

Next, the controller 102 refers to the page mapping table 157 of the physical blocks indicated by the read physical block number (step 203), reads the latest data and stores it in the buffer 106 (step 204).

Finally, the controller 102 transfers the data from the buffer 106 to the host 10 (step 205).

This is the end of the read processing. Next, the write processing is described with reference to FIG. 14.

Figure 14:
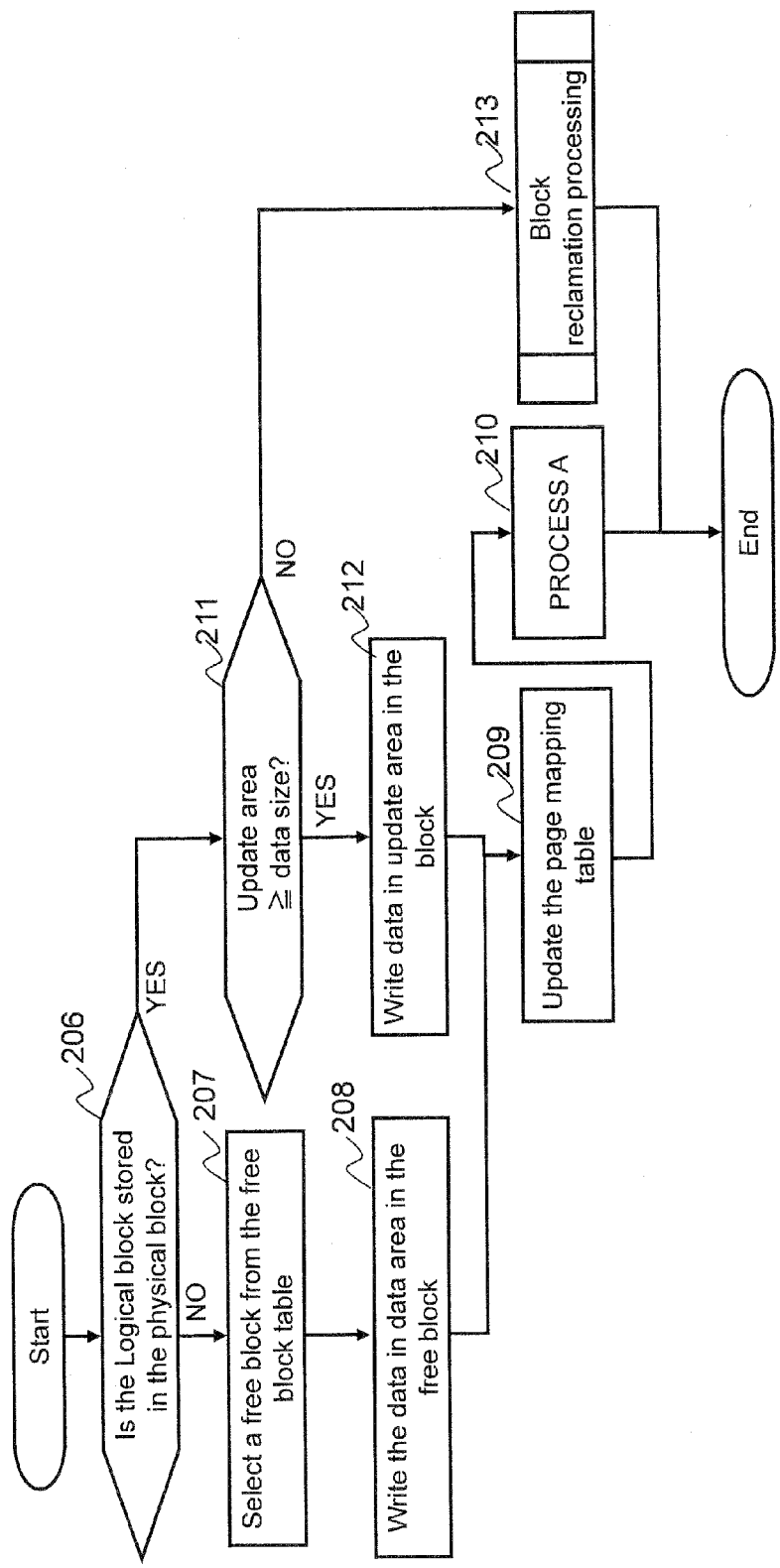
FIG. 14 is an example of a flowchart showing the flow of the write processing.

FIG. 14 is an example of a flowchart showing the flow of the write processing.

Firstly, the controller 102 receives a write command from the host 10, and determines whether the logical block comprising the logical block address specified by the write command (hereinafter referred to as a write destination logical block) is allocated to a physical block or not (step 206). The controller 102, for example, refers to the mapping table 140 and, if the physical block address corresponding with the write destination logical block is not NULL, the write destination logical block can be determined to be allocated to a physical block.

If the result of the determination at the step 206 is negative (i.e. if the write destination logical block is determined not to be stored in the physical block) (step 206: NO), the write destination logical block must be allocated to a free block. Therefore, the controller 102 selects a free block from the free block table 170 (step 207). If multiple free blocks exist, a free block may be selected randomly, or the free block with the lowest erase count may also be selected. After a free block is selected, the controller 102 writes the write data (write target data) in the data area 111 in the selected free block (step 208).

Then, the controller 102 updates the page mapping table 157 selected at the step 207 (step 209). Finally, the controller 102 completes the write processing by updating each of the logical block table 161, the physical block table 151, and the mapping table 140 to the latest status (step 210). Note that the step 210 is referred to as "Process A" in FIG. 14. In the "Process A", for example, the controller 102, in the mapping table 140, makes the number of the write destination logical block correspond to the chip number 141 and the physical block number 142 of the free block selected at the step 207. Note that, if the step 206 is NO and if no data is stored in the update area, it may also be permitted to skip the step 209.

If the result of the determination at the step 206 is positive (i.e. if the write destination logical block is determined to be already allocated to the physical block) (step 206: YES), the controller 102 performs the following determination. That is, the controller 102 compares the number of the remaining writable pages and the number of write pages and determines whether the write data can be written in the update area or not (i.e. whether the number of the remaining writable pages is equal to or larger than the number of write pages or not) (step 211). At this point, the "number of remaining writable pages" indicates the number of pages remaining without any data written (writable pages) in the update area 112 in the physical block to which the write destination logical block is allocated. On the other hand, "the number of write pages" is the value which can be calculated by dividing the transfer length specified in the write command by the page size.

If the result of the determination at the step 211 is positive (i.e. if the number of the remaining writable pages is equal to or larger than the number of write pages) (step 211: YES), the controller 102 writes the write data in the update area 112 in the physical block to which the write destination logical block is allocated (step 212). Then, the controller 102 completes the write processing by performing the step 209 and the step 210. Note that, at the step 209, the controller 102 makes the index corresponding to the write destination table in the update area 112 (the index in the page mapping table 157 corresponding to write destination physical block) correspond to the page (the page where the update data is stored) number in the data area 111 in the write destination physical block.

If the result of the determination at the step 211 is negative (i.e. if the number of the remaining writable pages is less than the number of write pages) (step 211: YES), the controller 102 performs the reclamation processing (step 213). The details of the reclamation processing are described later. After the reclamation processing, the write processing is completed. Note that, even if the step 206 is YES, if the write is performed for an unwritten page in the data area 111, instead of the steps 211 and 212, it may also be permitted that the write data is written to the unwritten page.

Figure 15:
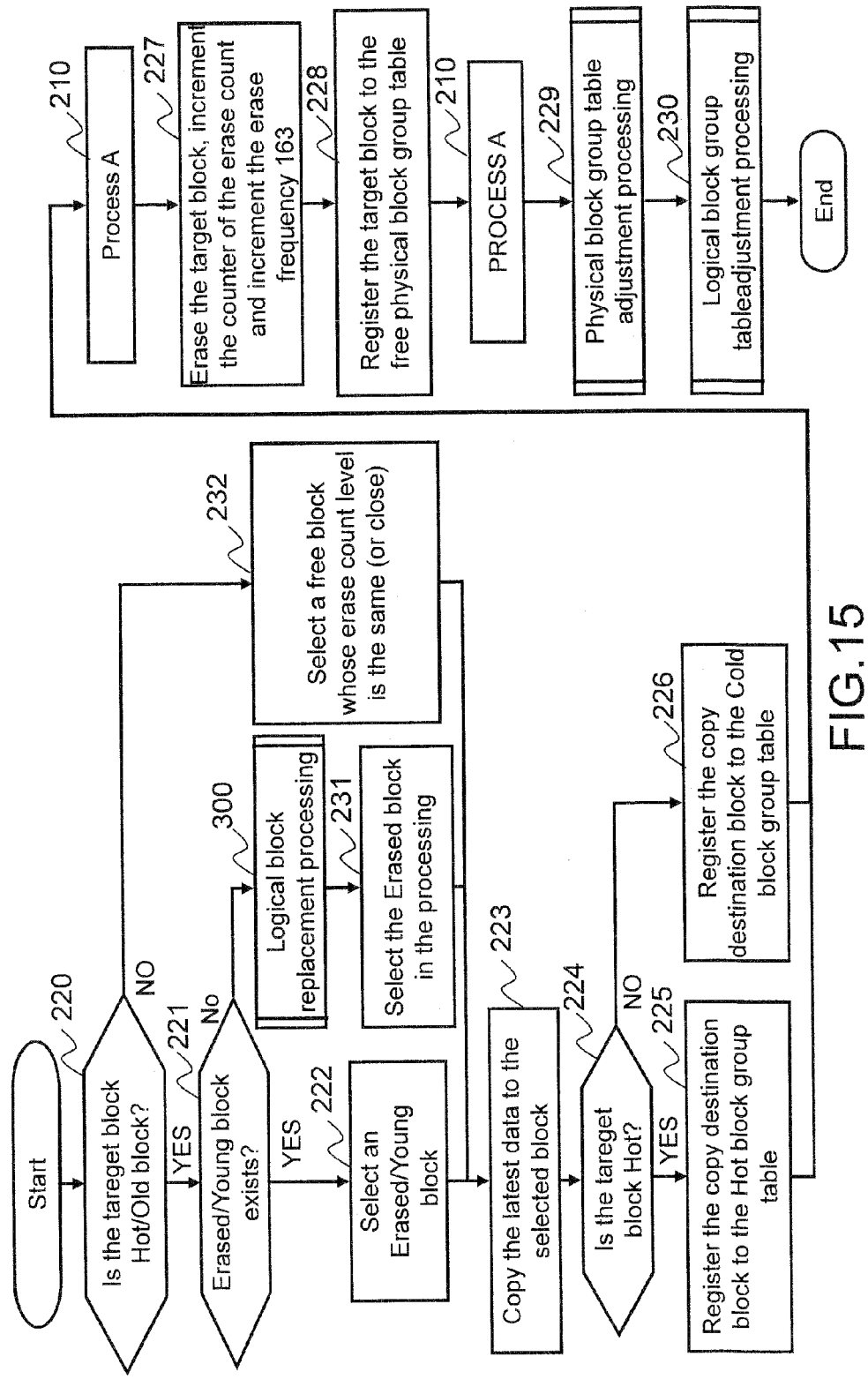
FIG. 15 is an example of a flowchart showing the flow of the reclamation processing.

FIG. 15 is an example of a flowchart showing the flow of the reclamation processing.

The reclamation processing in this embodiment is the processing performed if the size of the write data is larger than the total size of the remaining writable pages in the update area 112 in the physical block. In this processing, the erase processing is performed for the physical block allocated to the write destination logical block (hereinafter referred to as an original physical block), the latest data is written to the physical block newly allocated to the write destination logical block (hereinafter referred to as a new physical block), and at the same time, the logical block group and the physical block group are reconfigured. This reclamation processing is described below. Note that, in the following description, "a physical block to which a logical block classified as belonging to the Hot block group is allocated and at the same time whose erase count level number belongs to Old (that is, an Old block to which a Hot block is allocated)" is referred to as a "Hot/Old block". Meanwhile, "a physical block to which a logical block classified as belonging to the Cold block group is allocated and at the same time whose erase count level number of the erase count belongs to Young (that is, an Young block to which a Cold block is allocated)" is referred to as a "Cold/Young block". Furthermore, "a physical block classified as belonging to the free block group and at the same time whose erase count level number belongs to Young" is referred to as an "Erased/Young block".

The trigger for performing the reclamation processing is, as described above, the determination that, in the write processing, the write data cannot be additionally written to the update area 112 of the physical block. The reclamation processing, for example, can be started by specifying the logical block address specified by the write command. In the description below, a physical block allocated to the write destination logical block (i.e. an original physical block) is referred to as a "target block".

Firstly, the controller 102 determines whether the target block is a Hot/Old block or not (step 220). As more specifically described, for example, the controller 102 refers to the Hot/Cold determination flag 164 in the logical block table 161 and determines whether the write destination logical block is Hot or not. If the write destination logical block is Hot, the controller 102 determines whether the erase count of the target block is higher than the physical block classification threshold counter 156 or not (i.e. whether the target block is Old or not).

If the result of the determination at the step 220 is positive (i.e. if the target block is determined to be a Hot/Old block) (step 220: YES), the controller 102 refers to the free block table 170 and determines whether any Erased/Young blocks exist or not (step 221). If any Erased/Young blocks exist (step 221: YES), the controller 102 selects one Erased/Young block (step 222) and copies the data in the target block to the selected free block (step 223). Next, the controller 102 determines whether the target block (write destination logical block allocated to the target block, to be more strict) is Hot or not (step 224). If the target block is Hot (step 224: YES), the controller 102 registers the copy destination physical block at the step 223 to the Hot block group table (refer to FIG. 10) (step 225). On the other hand, if the target block is not Hot (step 224: NO), the controller 102 registers the copy destination physical block at the step 223 to the Cold block group table (refer to FIG. 11) (step 226). After the registration is completed, the controller 102 updates each of the logical block table 161, the physical block table 151, and the mapping table 140 to the latest status (step 210, referred to as "Process A"). Then, the controller 102 erases the target block, increments the erase counter corresponding with the target block (erase counter in the physical block table 151) by one and, at the same time, increments the erase frequency 163 corresponding with the write destination logical block allocated to the target block (erase frequency in the logical block table 161) by one (step 227). The controller 102, as the target block is erased and therefore becomes a free block, registers the target block to the free block group table (refer to FIG. 12) (step 228). The controller 102 updates each of the tables to the latest status by performing the Process A again. Then, the controller 102 completes the reclamation processing by performing the physical block group adjustment processing (step 229) and performing the logical block group adjustment processing (step 230). Note that the details of the physical block group adjustment processing and the logical block group adjustment processing are described later.

If the result of the determination at the step 220 is negative (i.e. if the target block is determined not to be a Hot/Old block) (step 220: NO), the controller 102, for a free block as the copy destination of the data in the target block, selects one free block belonging to the same level of the erase count as the target block (or a free block belonging to the close level of the erase count to the target block) (step 232), and copies the data in the target block to the selected free block (step 223). The processing after the step 224 is the same as described above. Note that other methods of selecting a free block at the step 232 than described above may also be permitted. For example, the free block whose erase count is the lowest may be selected. The "free block belonging to the close level of the erase count to the target block" is a free block whose level of the erase count has a difference equal to or less than a specified value from the target block level of the erase count. It is preferable that the difference is as little as possible.

If it is determined that no Erased/Young block exists at the step 221 (step 221: NO), the logical block replacement processing is performed (step 300). Though the details of the logical block replacement processing are described later, the "logical block replacement processing" is the processing preparing an Erased block as Young as possible. The controller 102 selects an Erased block created by the logical block replacement processing (step 231) and copies the data in the target block to the selected Erased block (step 223).

This is the end of the description on the reclamation processing.

Figure 16:
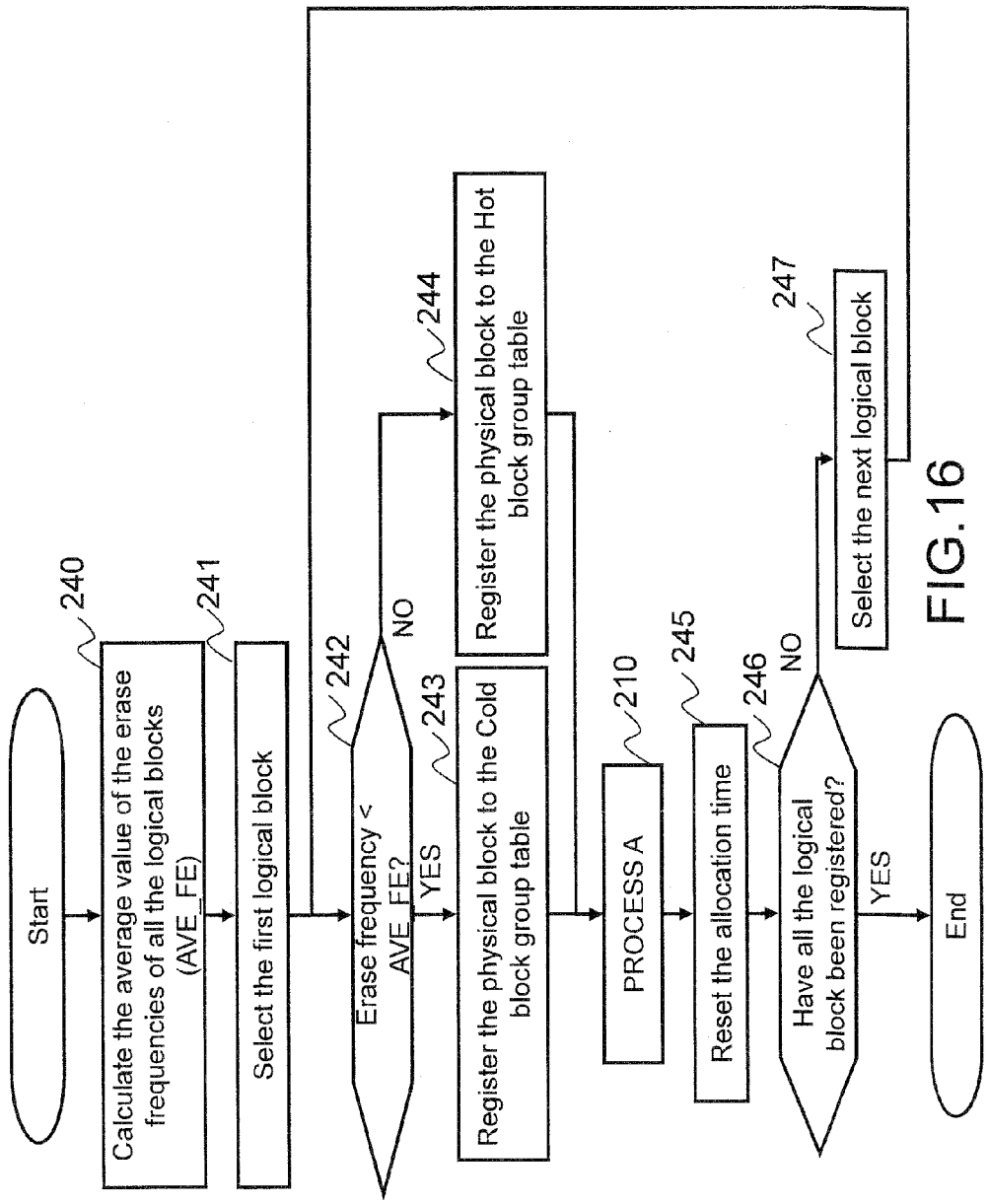
FIG. 16 is a flowchart showing an example of the flow of the logical block group adjustment processing in the Embodiment 1.

FIG. 16 is a flowchart showing an example of the flow of the logical block group adjustment processing.

The logical block group adjustment processing is, as described above, performed in the reclamation processing.

Firstly, the controller 102 calculates the average value of the erase frequencies of all the logical blocks in the flash memory device 100 (step 240). The average value of the erase frequencies is hereinafter referred to as an "AVE_EF" (Average Erase Frequency). The value of the logical block classification threshold counter 166 is updated to the AVE_EF.

Next, the controller 102 refers to the logical block table 161 and selects the first logical block (step 241).

Next, the controller 102 determines whether the erase frequency 163 of the selected logical block is lower than the AVE_EF or not (step 242).

If the result of the determination at the step 242 is positive (i.e. if the erase frequency 163 is determined to be lower than the AVE_EF) (step 242: YES), the controller 102 registers the physical block to which the logical block selected at the step 241 is allocated to the Cold block group table (step 243).

Meanwhile, if the result of the determination at the step 242 is negative (i.e. if the erase frequency 163 is determined to be equal to or higher than the AVE_EF) (step 242: NO), the controller 102 registers the physical block to which the logical block selected at the step 241 is allocated to the Hot block group table (step 244).

After the step 243 or 244, the controller 102 updates each of the logical block table 161, the physical block table 151, and the mapping table 140 to the latest status (step 210: referred to as "Process A").

Next, the controller 102 resets the allocation time information 165 of the logical block selected at the step 241 (step 245).

The controller 102 determines whether the above-mentioned processing was performed for all the logical blocks or not (step 246). If there are any logical blocks for which the processing is not performed yet (step 246: NO), the controller 102 selects the next logical block in the logical block table 161 (step 247), and performs the processing from the step 242 for the selected logical block. If the processing is performed for all the logical blocks (step 246: YES), the logical block group adjustment processing is completed.

Note that the logical block group adjustment processing, which performs the processing such as comparison and classification for all the logical blocks, includes a large amount of calculation. Therefore, this processing is not necessarily required to be performed each time the reclamation processing is performed. For example, in the reclamation processing, before the step 229 (logical block group adjustment processing), it may also be permitted to determine whether the processing at the step 229 is necessary or not and, if it is determined to be necessary, to perform the step 229. As a case where the step 229 is required, for example, a case where it is determined to be necessary to change the value of the logical block classification threshold counter 166 can be considered. As a case where it is determined to be necessary to change the value of the logical block classification threshold counter 166, for example, a case where the ratio of the various logical blocks to all the logical blocks falls below or exceeds the specified threshold can be considered. As more specifically described, for example, if the ratio of Hot blocks (or Cold blocks) to all the logical blocks falls below the first threshold (or exceeds the second threshold which is equal to or larger than the first threshold), the logical block group adjustment processing is performed.

The logical block group adjustment processing may also be permitted to be performed regularly, such as once a day. Note that it may also be permitted to, in the initial status of the flash memory device 100, manage all the logical blocks as Cold blocks (or all of them as Hot blocks) and, in accordance with the increase of the erase frequency, appropriately modify whether each of the logical blocks is Cold or Hot.

Figure 17:
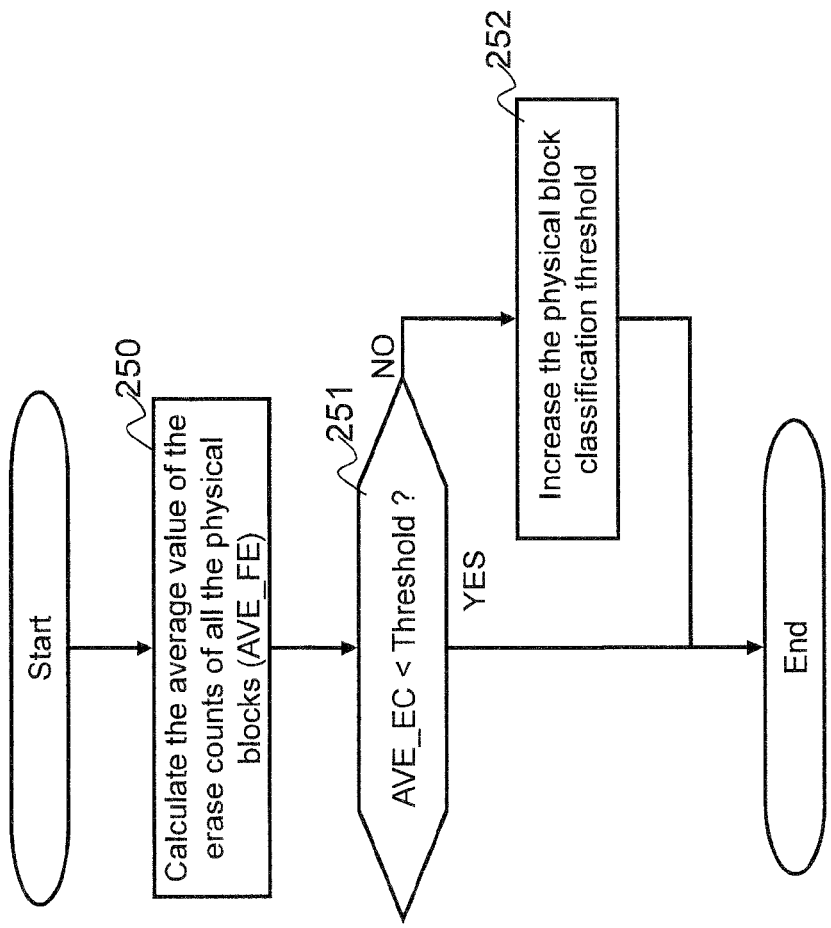
FIG. 17 is a flowchart showing an example of the flow of the physical block group adjustment processing.

FIG. 17 is a flowchart showing an example of the flow of the physical block group adjustment processing.

The physical block group adjustment processing is, as described above, performed in the reclamation processing.

Firstly, the controller 102 calculates the average value of the erase counts of all the physical blocks in the flash memory device 100 (step 250). This is calculated by dividing the total erase count 158 in the physical block management information 150 by the total number of physical blocks. The average value of the erase count calculated at this point is hereinafter referred to as an "AVE EC" (Average Erase Cycle).

Next, the controller 102 determines whether the value of the physical block classification threshold counter 156 is larger than the AVE EC or not (step 251).

If the result of the determination at the step 251 is positive (step 251: YES), the controller 102 completes the physical block group adjustment processing.

Meanwhile, if the result of the determination at the step 251 is negative (i.e. if the value of the physical block classification threshold counter 156 is equal to or smaller than the AVE EC) (step 251: NO), the controller 102 increases the value of the physical block classification threshold counter 156 (step 252). As more specifically described, for example, the value corresponding with the average erase count of physical blocks is added to the physical block classification threshold counter 156. This is for classifying the Old and the Young correctly. As more specifically described, for example, if the AVE_EC is N, the value of the physical block classification threshold counter 156 may also be specified as N.

Figure 18:
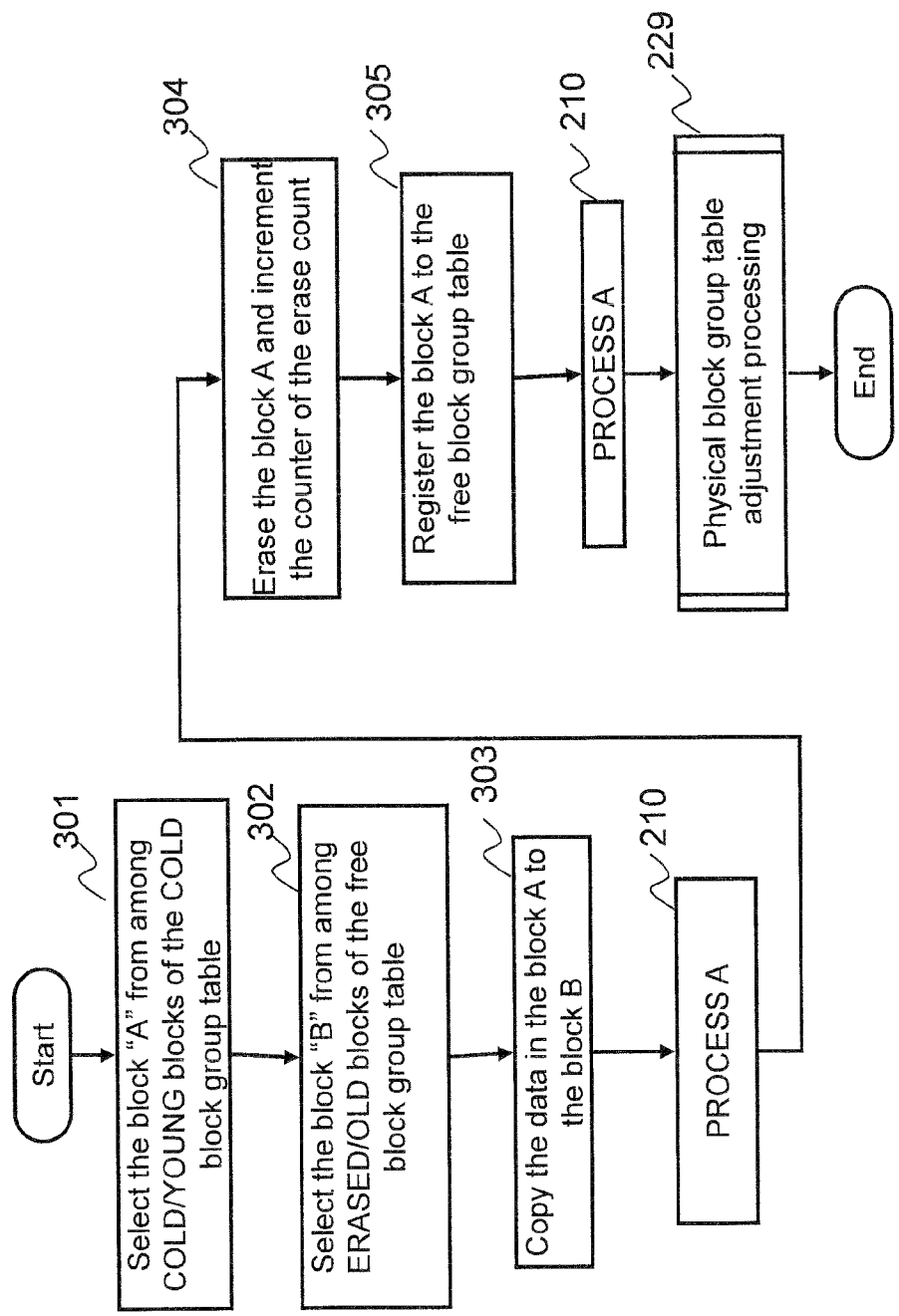
FIG. 18 is a flowchart showing an example of the flow of the logical block replacement processing.

FIG. 18 is a flowchart showing an example of the flow of the logical block replacement processing.

The logical block replacement processing is also performed in the reclamation processing as described above. The purpose of this processing is creating as Young Erased blocks as possible.

Firstly, the controller 102 searches for the physical blocks belonging to the lowest level for the erase count 180 among the physical blocks belonging to the Cold block group table. If there is no Cold block belonging to the lowest level of the erase count, the controller 102 searches for the physical blocks belonging to the second lowest level for the erase count. This is repeated until a physical block is found. The physical block found at this point is hereinafter referred to as a "block A" (step 301). As physical blocks are classified by the erase count given a certain degree of range, the block A does not necessarily have the lowest erase count, but a physical block with a relatively low erase count can be expected to be found through a small amount of search processing. Note that, as described above, the configuration of the Cold block group table may also be permitted to be other than the list type.

Next, the controller 102, among the physical blocks belonging to the free block group table, selects one free block belonging to the highest level 180 for the erase count. The free block selected at this point is hereinafter referred to as a "block B" (step 302).

Next, the controller 102 copies the data in the block A to the block B (step 303).

After the data is copied, the controller 102 updates each of the logical block table 161, the physical block table 151, and the mapping table 140 to the latest status (step 210, referred to as "Process A").

Next, the controller 102 erases the block A and increments the counter of the erase count 153 of the block A by one (step 304).

Next, the controller 102 registers the block A to the free block group table (step 305).

Next, the controller 102 performs the Process A again (step 210) and performs the physical block group adjustment processing (refer to FIG. 16) (step 229).

This is the end of the logical block replacement processing. By following the above-mentioned procedure, as Young Erase blocks as possible are provided as well as the logical blocks with the low erase frequencies are allocated to the physical blocks with the high erase count, which helps level the erase count. Note that, in the reclamation processing and the logical block replacement processing, before the physical block group adjustment processing, it may also be permitted to determine whether the physical block group adjustment processing is necessary or not and, if it is determined to be necessary, to perform physical block group adjustment processing.

Embodiment 2

The second embodiment of this invention is described below. Note that, in the description below, the differences from the first embodiment are mainly described, and the items common to the Embodiment 1 are omitted from the description.

In the second embodiment, compared to the first embodiment, the physical block management information and the method of classifying logical blocks are different. As more specifically described, in the second embodiment, as well as the physical block management information used in the first embodiment, the information for showing the guarantee period of the flash memory device is required. Furthermore, while the first embodiment classifies logical blocks into Hot block groups and Cold block groups according to the average values of the erase frequencies, the second embodiment classifies the logical blocks depending on whether the erase frequency is equal to or higher than the previously specified allowable erase frequency or not. At this point, the "allowable erase frequency" is a type of threshold for the erase frequency and, for example, the numeric value calculated by dividing the possible erase count (upper limit value) of physical blocks by the guarantee period of the flash memory device.

Figure 19:
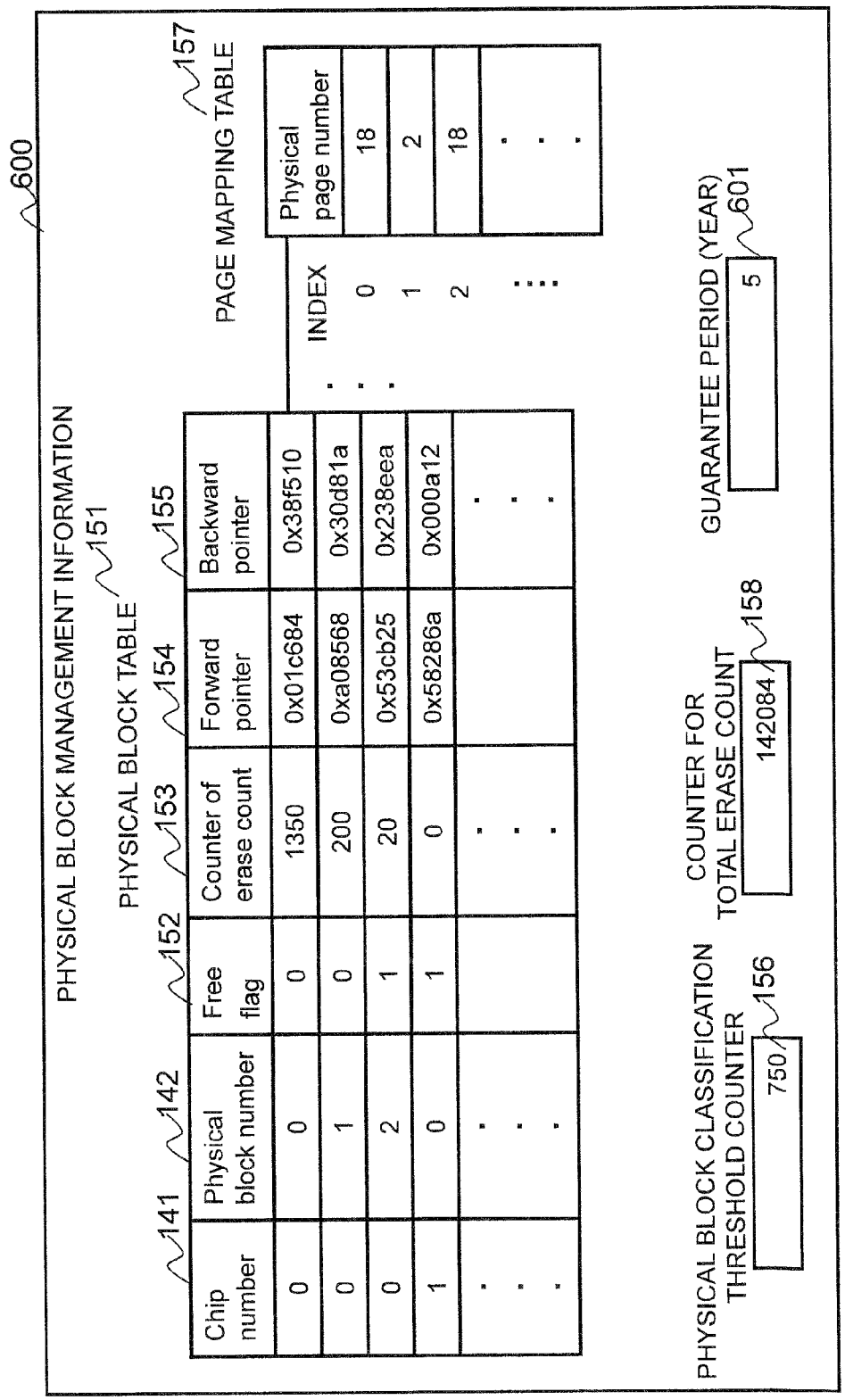
FIG. 19 is a diagram showing an example of the physical block management information in the Embodiment 2.

FIG. 19 is a diagram showing an example of the physical block management information in the second embodiment.

The physical block management information 600 includes the guarantee period 601 of the flash memory device. At this point, the guarantee period 601 indicates the remaining guarantee period of the flash memory device from the present. Therefore, with the passage of time, the guarantee period 601 is appropriately updated. Note that, according to the example in FIG. 19, the guarantee period 601 is the number of remaining years, but any information may also be permitted as long as it shows the period. For example, it may also be permitted that the guarantee period 601 is the information showing the date and time of the end of the guarantee period.

Figure 20:
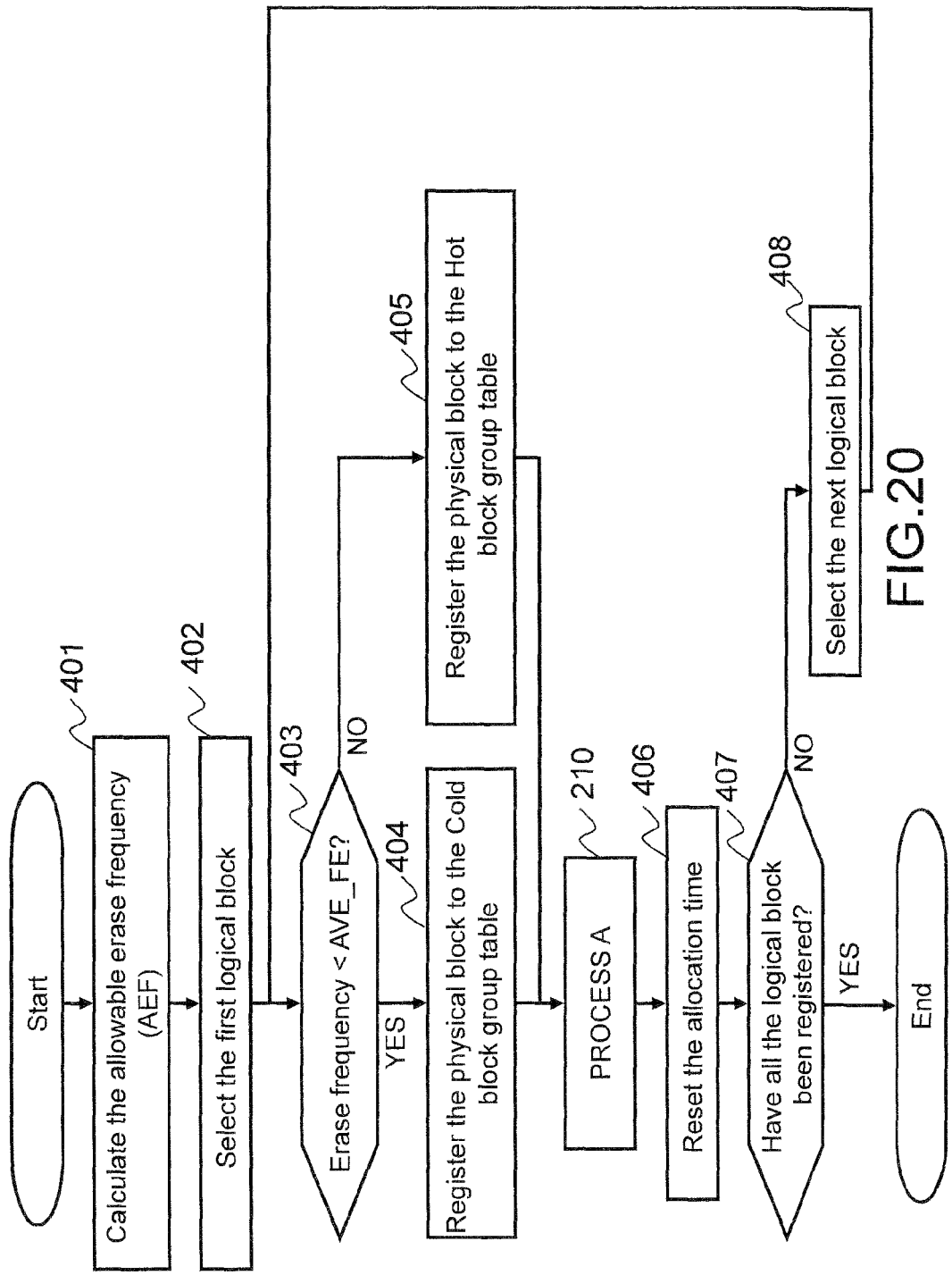
FIG. 20 is a flowchart showing an example of the flow of the logical block group adjustment processing in the Embodiment 2.

FIG. 20 is a flowchart showing an example of the flow of the logical block group adjustment processing in the second embodiment.

Firstly, the controller 102 calculates the allowable erase frequency with reference to the guarantee period 601 of the flash memory device and the possible erase count of physical blocks (step 401). The allowable erase frequency is hereinafter referred to as the "AEF" (Allowable Erase Frequency). For example, if the possible erase count of respective physical blocks (upper limit of the erase count) is 10000 times and the remaining guarantee period of the flash memory device is 5 years, the AEF is 10000 times/5 years=2000 times/year.

Next, the controller 102 refers to the logical block table 161 and selects the first block (step 402).

Next, the controller 102 determines whether the erase frequency 163 of the logical block selected at the step 402 is lower than the AEF or not (step 403).

If the result of the determination at the step 402 is positive (i.e. if the erase frequency 163 is determined to be lower than the AEF), the controller 102 registers the physical block allocated to the logical block selected at the step 402 to the Cold block group table (step 404).

Meanwhile, if the result of the determination at the step 402 is negative (i.e. if the erase frequency 163 is determined to be lower than the AEF), the controller 102 registers the physical block allocated to the logical block selected at the step 402 to the Hot block group table (step 405).

After the step 404 or 405, the controller 102 updates each of the logical block table 161, the physical block table 151, and the mapping table 140 to the latest status (step 210: referred to as "Process A")

Next, the controller 102 resets the allocation time information 165 of the logical block selected at the step 402 (step 406).

The controller 102 determines whether the above-mentioned processing was performed for all the logical blocks or not (step 407). If there are any logical blocks for which the processing is not performed yet (step 407: NO), the controller 102 selects the next logical block in the logical block table 161 (step 408), and performs the processing from the step 403 for the selected logical block. If the processing is performed for all the logical blocks (step 407: YES), the logical block group adjustment processing is completed.

Embodiment 3

The third embodiment is described below with reference to FIG. 21 and FIG. 22.

Figure 21:
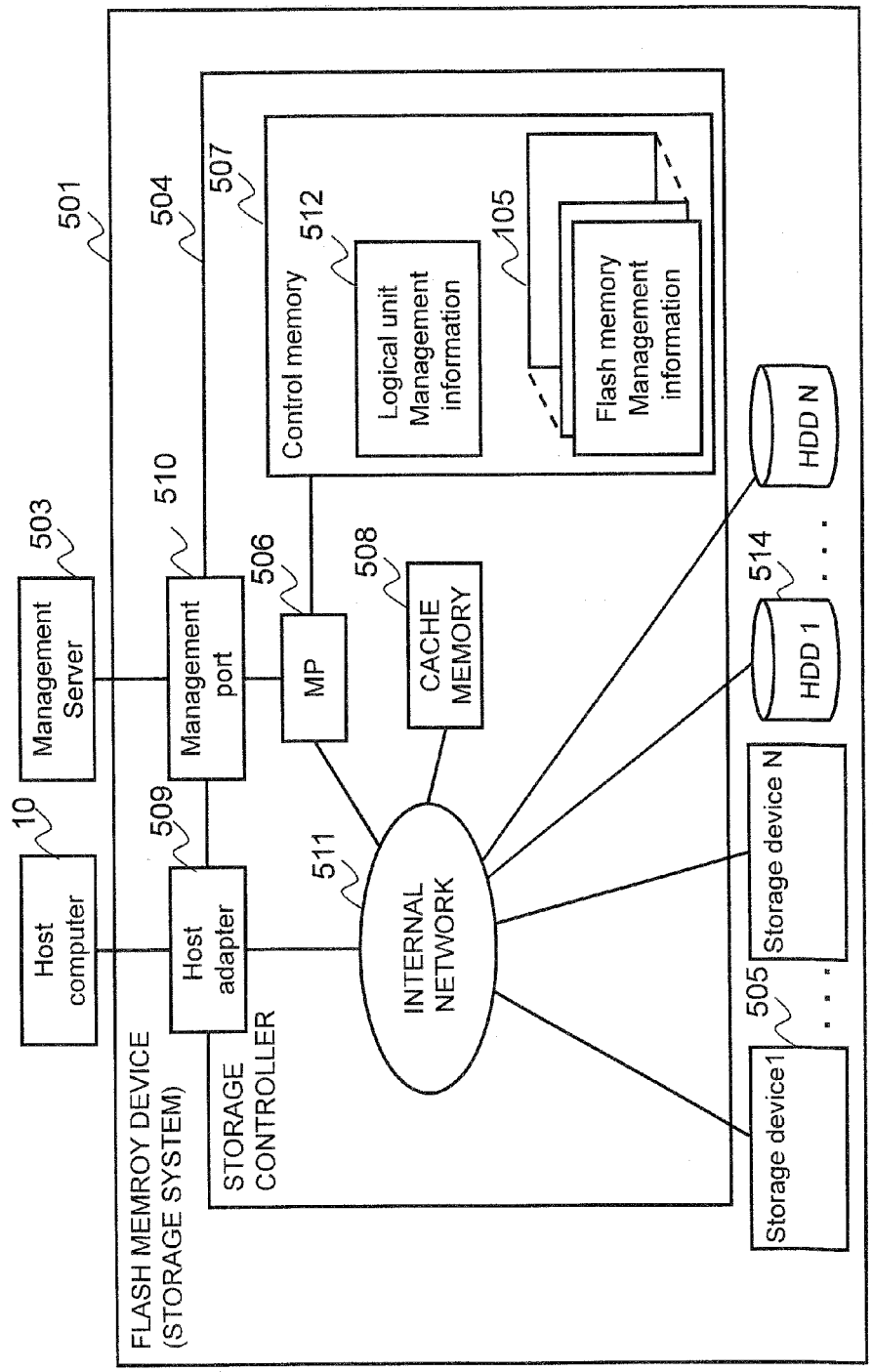
FIG. 21 is a block diagram showing an example of a flash memory device related to the Embodiment 3.

FIG. 21 is a block diagram showing an example of a flash memory device related to the third embodiment.

In the third embodiment, the flash memory device 501 is a storage system comprising multiple storage drives (flash drives) 505. In the third embodiment, the controller of the storage system (storage controller) 504 performs wear-leveling. As more specifically described, for example, the storage controller 504 can perform the processing from FIG. 15 to FIG. 18. The storage controller 504 may also be permitted to perform the processing of FIG. 20 instead of the processing of FIG. 16.

One or multiple RAID (Redundant Array of Independent (or Inexpensive) Disks) groups are configured based on multiple storage drives 505. The storage controller 504 manages the logical unit to provide to the host 10. The storage controller 504, in response to a write/read request from the host 10, identifies the storage area of the access destination, and sends the write/read command specifying the address of the identified storage area to each of the storage drives 505 belonging to the RAID group which is the basis of the identified storage area. The logical unit may also be permitted to be the logical unit following the Thin Provisioning technology. In this case, the logical unit is configured of multiple virtual chunks, and the storage controller 504 manages multiple actual chunks. The actual chunks are based on the multiple storage drives 505 configuring the RAID group. The storage controller 504:
(1) responds to the write request from the host 10 and determines whether the actual chunks are allocated to the virtual chunks of the write destination or not and,
(2) if the result of the determination at (1) is negative, allocates unallocated actual chunks to the virtual chunks of the write destination, and
(3) writes the write target data to the actual chunks allocated at (2). At (3), the storage controller 504 sends a data write command to each of the storage drives 505 based on the actual chunks of the write destination.

Incidentally, to the storage system 501, the host 10 which is a type of higher-level device and issues I/O (Input/Output) requests and the management server 503 which is the computer managing the storage system 501 are connected. The storage controller 504 comprises one or more host adapters 509 for sending and receiving data to/from the host 10, one or more management ports 510 for communicating with the management server 503, one or more microprocessors (hereinafter referred to as MPs) 506 for controlling the storage system 501, a control memory 507 for maintaining data and programs for control, and a cache memory 508 for which is the memory for caching data. Meanwhile, the storage controller 504 comprises the internal network 511 for mutually connecting the storage drive 505, the cache memory 508, the host adapters 509, the MP 506 and others. One memory may also be permitted to be both the control memory 507 and the cache memory 508. To the internal network 511, one or more hard disk drives (HDDs) 514 may also be permitted to be connected. That is, in the storage system 501, a flash drive and an HDD may also be permitted to be mixed. A flash drive may also be permitted to be an SSD (Solid State Drive). It may also be permitted if no HDDs exist.

The control memory 507, for example, stores logical unit management information 512 for managing each of logical units and the above-mentioned flash memory management information 105. For the flash memory management information 105, for example, the same number of pieces as the storage drives 505 in the storage system 501 is all that is required.

Figure 22:
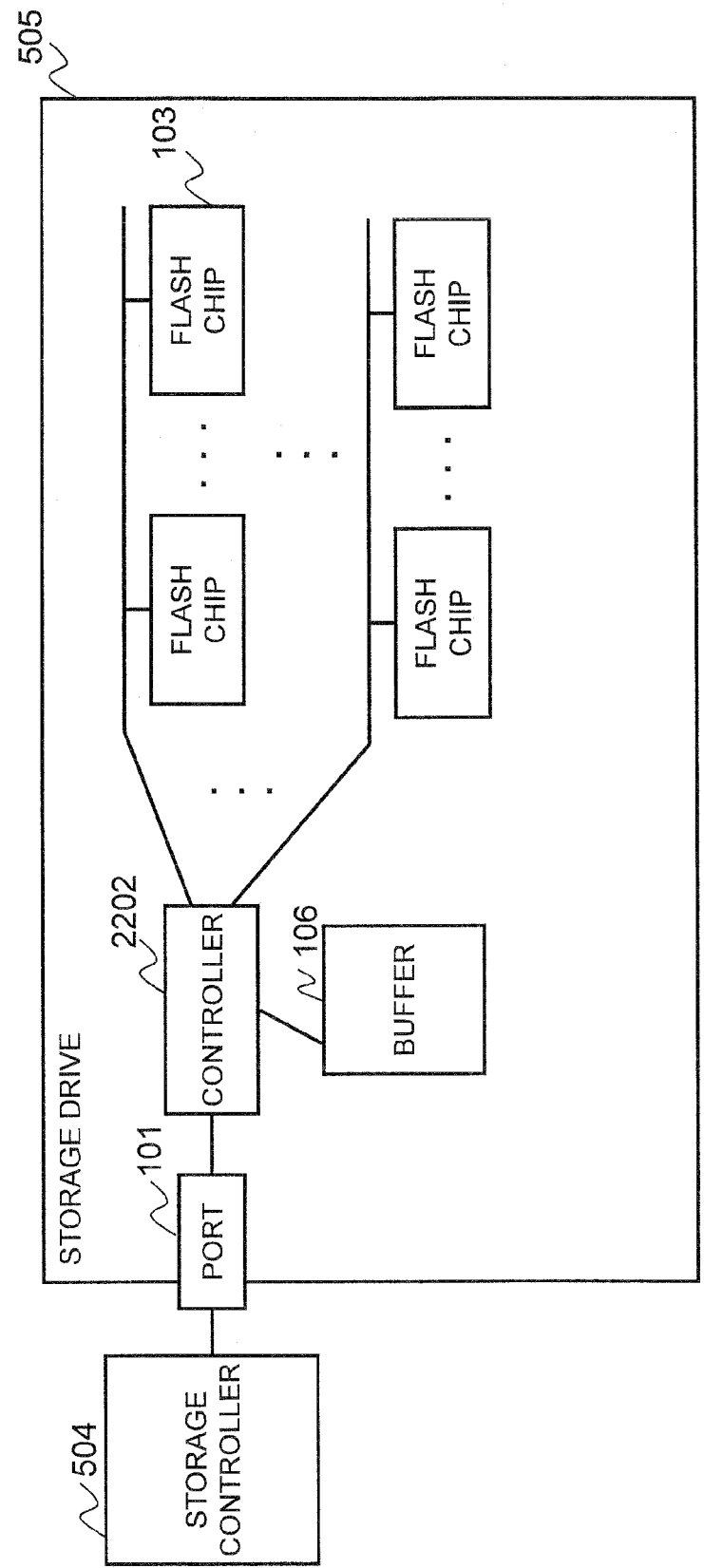
FIG. 22 is a block diagram showing a configuration example of a storage drive 505 in the Embodiment 3.

FIG. 22 is a block diagram showing a configuration example of a storage drive 505 in the third embodiment.

The storage drive 505, unlike the first embodiment (and the second embodiment), does not comprise flash memory management information 105. Therefore, the controller 2202, not performing wear-leveling, performs write/read processing in response to write/read commands from the storage controller 504.

In the third embodiment, the part performing the wear-leveling processing is the storage controller 504, and the target of the wear-leveling processing is the blocks in each storage drive 505. That is, the storage controller 504 must keep track of information related to the blocks in the storage drive 505. Therefore, the storage drive 505 is not required to comprise flash memory management information 105, and the storage controller 504 comprises flash memory management information 105 of each storage drive 505.

Embodiment 4

The fourth embodiment is different from the first embodiment in that the flash memory device comprising flash chips are incorporated as a storage device inside the host 10. The fourth embodiment is described below with reference to FIG. 23.

Figure 23:
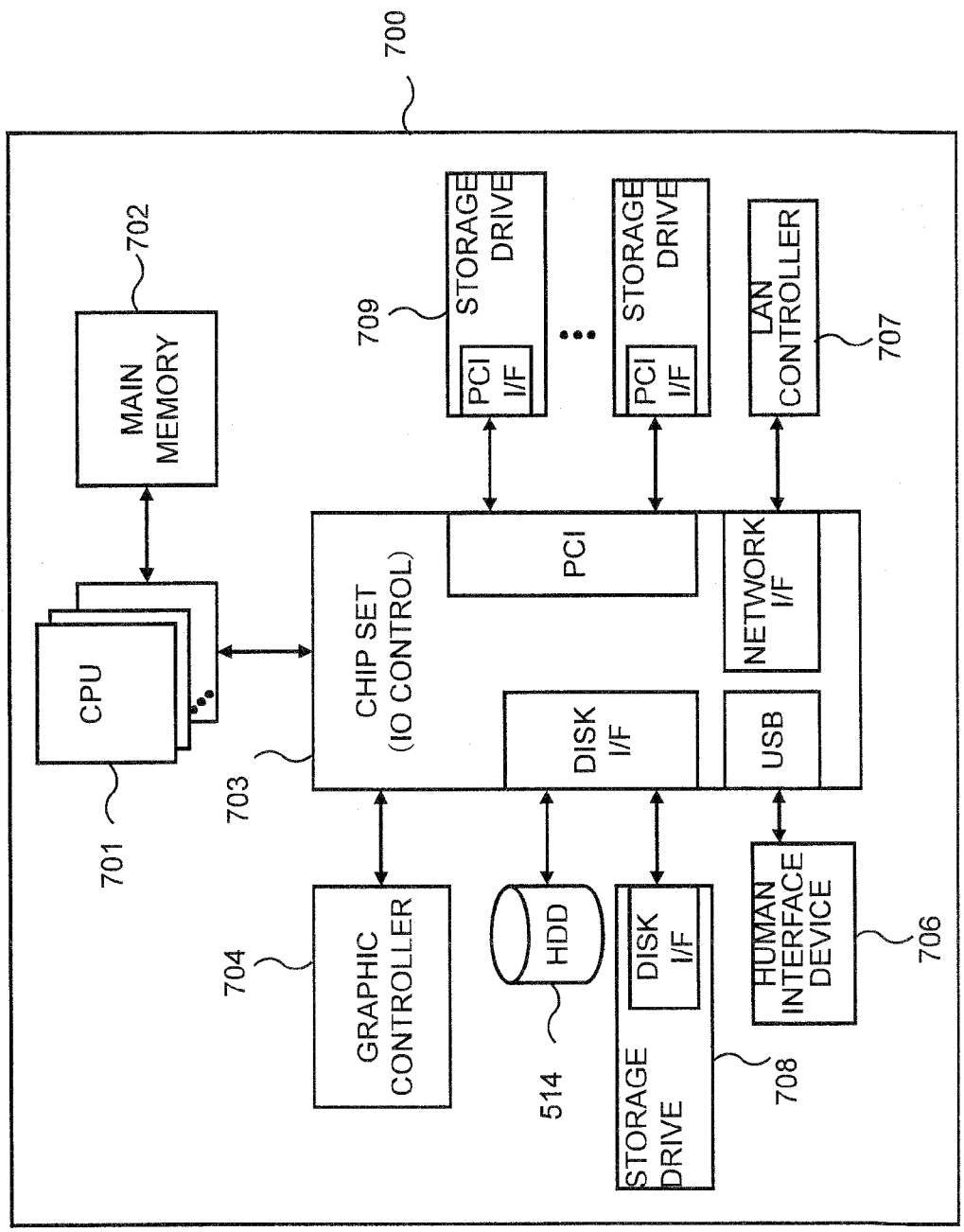
FIG. 23 is a block diagram showing a configuration example of a host 700 in the Embodiment 4.

FIG. 23 is a block diagram showing a configuration example of a host 700 in the Embodiment 4.

The host 700 comprises CPUs 701 for controlling the host 700, a main memory 702 in which data for performing control and the programs such as an OS are stored, and a chip set 703 for connecting the internal components configuring the host 10 computer 700. Meanwhile, the host 700 comprises a graphic controller 704 for performing graphic control, HDDs 514 for storing data, and the human interface device 706 for controlling input/output by the mouse, the keyboard or the display. Furthermore, the host 700 comprises a LAN controller 707 for controlling the network connection, a storage drive 708 using a flash memory and comprising a disk interface such as ATA or SAS, and a storage drive 709 using a flash memory and comprising a PCI interface. Note that the chip set 703 is assumed to include ports and connectors for realizing various types of interface connection such as the PCI interface, the USB interface, and the network interface.

At this point, the storage drive 708 may be permitted to be the same as a storage drive in any of the first to third embodiments. The storage drive 709, comprising the PCI interface unlike the interface of the storage drive 708, may also be permitted to be the same in the other parts.

In the fourth embodiment, if the storage drive 708 or 709 has flash memory management information 105 required for wear-leveling, the controller in the storage drive 708 or the storage drive 709 may be permitted to perform wear-leveling.

In the fourth embodiment, if the storage drive 708 or 709 does not have flash memory management information 105 required for wear-leveling, for example, it may be permitted that the main memory 702 stores flash memory management information 105 and that the CPUs 701 perform wear-leveling.

Though the embodiments of this invention have been described above, those are merely explanatory and the scope of the invention is not limited to those embodiments. This invention may be embodies in various other forms.

Reference Signs List

10 Host computer
100 Flash memory device
101 Host interface port
102 Controller
103 Flash memory chip
104 Main memory
105 Flash memory management information
106 Buffer
110 Block
111 Data area
112 Update area
113 Page
120 Logical block space
121 Logical block
122 Physical block space
123 Allocated block
124 Free block
125 Invalid block
130 Physical block group A
131 Physical block group B
132 Logical block group A
133 Logical block group B
140 Mapping table
141 Chip number
142 Physical block number
150 Physical block management information
151 Physical block table
152 Free flag
153 Counter of the erase count
154 Forward pointer
155 Backward pointer
156 Physical block classification threshold counter
157 Page mapping table
158 Counter for total erase count
160 Logical block management information
161 Logical block table
162 Logical block number
163 Erase frequency
164 Logical block classification flag
165 Allocation time
166 Logical block classification threshold counter
170 Free block table
180 Erase count level number
600 Physical block management information
601 Guarantee period
501 Storage system
503 Management server
504 Storage controller
505 Storage device
506 MP (Microprocessor)
507 Control memory
508 Cache memory
509 Host adapter
510 Management port
511 Internal network
512 Logical unit management information
514 HDD (Hard Disk Drive)
701 CPU
702 Main memory
703 Chip set
704 Graphic controller
706 Human interface device
707 LAN controller
708 Storage device
709 Storage device
2202 Controller

The invention claimed is:

1. A flash memory device comprising:
multiple flash memory chips including multiple physical blocks, each of the multiple physical blocks being an erase unit and including multiple physical pages, each of the multiple physical pages being a read/write unit; and a controller that allocates a physical block from among the multiple physical blocks to a certain logical block among multiple logical blocks that constitute a logical block space to a computer, wherein the controller:

(A) manages an erase count for each physical block and the erase frequency of each logical block, and when the erase processing is carried out for the one or more physical blocks, updates the erase count for those one or more physical blocks, and the erase frequency of the logical block allocated to the physical blocks; and (B) allocates a physical block whose erase count is lower than a threshold to logical blocks whose erase frequency is greater than or equal to an erase frequency threshold, wherein the controller executes reclamation processing when the size of a free space of one or more target blocks is smaller than the size of data that is a write command target, wherein the one or more target blocks are one or more physical blocks to which the write destination logical block is allocated, wherein the write destination logical block is a logical block having an address specified in a write command from the host, and in the reclamation processing, the controller:

(a) determines whether the erase frequency of the write destination logical block is greater than or equal to the erase frequency threshold, and whether the erase count of the target block is greater than or equal to an erase count threshold;

(b) if the result of the determination in (a) is positive, selects one or more free blocks as an allocation destination of the write destination logical block from among multiple free blocks that are physical blocks having an erase count that is lower than the erase count threshold, and if the result of the determination in (a) is negative, the controller selects, from among the multiple free blocks, a free block having erase count corresponding to a level of erase count which is the same as, or as close as possible to, a level of erase count to which erase count of the target block belongs;

(c) copies the latest data for each storage area within the target block to the free block selected in (b), and allocates the write destination logical block to the copy destination free block;

(d) carries out the erase processing for the target block, and in accordance with this operation, updates erase count of the target block and updates the erase frequency of the write destination logical block;

(e) manages the target block as a free block;

(f) increases erase count threshold if erase count threshold is equal to or less than an average value of erase count of the multiple physical blocks; and (g) updates the erase frequency threshold to the average value of the erase frequencies of the multiple logical blocks.

2. The flash memory device according to claim 1, wherein the multiple flash memory chips are included in multiple flash drives, wherein one or more RAID groups are configured based on the multiple flash drives, wherein the controller manages a logical unit, receives access requests from the host that specifies the logical unit, identifies the storage area for the logical unit based on the address specified in the access request, and issues an access command to the flash drives configuring the RAID group which is the basis of the identified storage area, and wherein the controller carries out the reclamation processing for each of the multiple flash drives.

3. The flash memory device according to claim 1, wherein the controller stores cold block management information, which is information associated with a physical block allocated to a logical block whose erase frequency is less than the erase frequency threshold, and hot block management information, which is information associated with a physical block allocated to a logical block whose erase frequency is greater than or equal to the erase frequency threshold, wherein prior to the processing in (g), if the erase frequency of the write destination logical block is greater than or equal to the erase frequency threshold, the controller associates the copy destination physical block in (c) with the hot block information, and if the erase frequency of the write destination logical block is less than the erase frequency threshold, the controller associates the copy destination physical block in (c) with the cold block information, and wherein in (g), the controller associates the physical block allocated to each logical block whose erase frequency is less than the erase frequency threshold after updating with the cold block information, and associates the physical block allocated to each logical block whose erase frequency is greater than or equal to the erase frequency threshold after updating with the hot block information.

4. A storage system, wherein in the flash memory device according to claim 1, wherein the controller manages information representing a guarantee period of the flash memory device, wherein the controller updates the erase frequency threshold to an allowable erase frequency instead of the average value of the erase frequencies of the multiple logical blocks, and wherein the allowable erase frequency is a value obtained by dividing an upper limit of erase count of the physical block by the guarantee period.

5. The flash memory device according to claim 1, wherein the erase frequency threshold is a value based on the statistics of the erase frequencies of the multiple logical blocks.

6. The flash memory device according to claim 1, wherein the erase frequency threshold is a value obtained by dividing an upper limit of erase count of the physical block by the guarantee period of the flash memory device.

7. The flash memory device according to claim 1, wherein the multiple flash memory chips are included in multiple flash drives, one or more RAID groups are configured based on the multiple flash drives, and wherein the controller manages a logical unit, receives access requests from the host that specifies the logical unit, identifies the storage area for the logical unit based on the address specified in the access request, and issues an access command to the flash drives configuring the RAID group which is the basis of the identified storage area.

8. A flash device comprising:

multiple flash memory chips including multiple physical blocks, each of the multiple physical blocks being an erase unit and including multiple physical pages, each of the multiple physical pages being a read/write unit; and a controller that allocates a physical block from among the multiple physical blocks to a certain logical block among multiple logical blocks that constitute a logical block space to a computer, wherein the controller:

(A) manages an erase count for each physical block and the erase frequency of each logical block, and when the erase processing is carried out for the one or more physical blocks, updates the erase count for those one or more physical blocks, and the erase frequency of the logical block allocated to the physical blocks; and (B) allocates a physical block whose erase count is lower than a threshold to logical blocks whose erase frequency is greater than or equal to an erase frequency threshold, wherein (B), the controller:

(B1) determines whether the erase frequency of the target logical block allocated to one or more target physical blocks is greater than or equal to the erase frequency threshold, and whether erase count of the target physical block is greater than or equal to an erase count threshold;

(B2) if the result of the determination in (B1) is positive, selects one or more free blocks whose erase count is lower than erase count threshold as an allocation destination of the target logical block, from among multiple free blocks that are physical blocks that can be the allocation destination of the logical block, and if the determination result in (B1) is negative, the controller selects, from among the multiple free blocks, a free block having erase count corresponding to a level of erase count which is the same as, or as close as possible to, a level of erase count to which erase count of the target block belongs; and (B3) copies the latest data for each storage area within the target physical block to the free block selected in (B2), and allocates the target logical block to the copy destination free block.

9. The flash memory device according to claim 8,
wherein the controller executes reclamation processing when the size of a free space of one or more target blocks is smaller than the size of data that is a write command target,
wherein the one or more target blocks are one or more physical blocks to which the write destination logical block is allocated,
wherein the write destination logical block is a logical block having an address specified in a write command from the host, and
wherein in the reclamation processing, the controller executes (B1).

\* \* \* \* \*